United States Patent
Balassanian

(10) Patent No.: US 6,629,163 B1
(45) Date of Patent: Sep. 30, 2003

(54) METHOD AND SYSTEM FOR DEMULTIPLEXING A FIRST SEQUENCE OF PACKET COMPONENTS TO IDENTIFY SPECIFIC COMPONENTS WHEREIN SUBSEQUENT COMPONENTS ARE PROCESSED WITHOUT RE-IDENTIFYING COMPONENTS

(75) Inventor: Edward Balassanian, Kirkland, WA (US)

(73) Assignee: Implicit Networks, Inc., Bellevue, WA (US)

( * ) Notice: Subject to any disclaimer, the term of this patent is extended or adjusted under 35 U.S.C. 154(b) by 0 days.

(21) Appl. No.: 09/474,664

(22) Filed: Dec. 29, 1999

(51) Int. Cl.[7] .................. G06F 13/00; H04L 12/56; H04L 12/54

(52) U.S. Cl. .................. 710/33; 710/1; 710/3; 710/20; 710/38; 710/51; 710/131; 370/401; 370/487; 370/498; 370/535; 370/536; 370/542

(58) Field of Search ............. 710/1, 3, 33, 38, 710/131, 132, 20, 51; 370/401, 487, 498, 535, 536, 542

(56) References Cited

U.S. PATENT DOCUMENTS

| | | | | |
|---|---|---|---|---|
| 5,425,029 A | * | 6/1995 | Hluchyj et al. | 370/235 |
| 5,568,478 A | | 10/1996 | van Loo, Jr. et al. | 370/392 |
| 5,710,917 A | | 1/1998 | Musa et al. | 707/201 |
| 5,870,479 A | | 2/1999 | Feiken et al. | 713/160 |
| 6,101,189 A | * | 8/2000 | Tsuruoka | 370/401 |
| 6,157,622 A | * | 12/2000 | Tanaka et al. | 340/7.46 |
| 6,275,507 B1 | * | 8/2001 | Anderson et al. | 370/487 |
| 6,359,911 B1 | * | 3/2002 | Movshovich et al. | 370/536 |

FOREIGN PATENT DOCUMENTS

| | | |
|---|---|---|
| EP | 0408132 A1 | 1/1991 |

OTHER PUBLICATIONS

Bhatti, Nina T., et al., "Coyote: A System for Constructing Fine-Grain Configurable Communication Services," The University of Arizona at Tucson, ACM Transactions on Computer Systems, vol. 16, No. 4, Nov. 1998, pp. 321–366.

O'Malley, Sean W. and Larry L. Peterson, "A Dynamic Network Architecture," University of Arizona, ACM Transactions on Computer Systems (TOCS), vol. 10, No. 2, May 1992, pp. 110–143.

Fiuczynski, Marc E. and Brian N. Bershad, "An Extensible Protocol Architecture for Application–Specific Networking," University of Washington at Seattle, Proceedings of the 1996 Winter USENIX Technical Conference.

Pardyak, Przemyslaw and Brian N. Bershad, "Dynamic Binding for an Extensible System," University of Washington at Seattle, Proceedings of the Second USENIX Symposium on Operating Systems Design and Implementation (OSDI) 1996.

Bailey, Mary L. et al., "PathFinder: A Pattern–Based Packet Classifier," University of Arizona at Tucson, Proceedings of the First Symposium on Operating Systems Design and Implementation, USENIX Association, Nov. 1994.

Mosberger, David, "Scout: A Path–Based Operating System," A Dissertation Submitted to the Faculty of the Department of Computer Science, The University of Arizona, pp. 87–97, 1997.

* cited by examiner

*Primary Examiner*—Jeffrey Gaffin
*Assistant Examiner*—Tammara Peyton
(74) *Attorney, Agent, or Firm*—Perkins Coie LLP

(57) ABSTRACT

A method and system for demultiplexing packets of a message is provided. The demultiplexing system receives packets of a message, identifies a sequence of message handlers for processing the message, identifies state information associated with the message for each message handler, and invokes the message handlers passing the message and the associated state information. The system identifies the message handlers based on the initial data type of the message and a target data type. The identified message handlers effect the conversion of the data to the target data type through various intermediate data types.

44 Claims, 16 Drawing Sheets

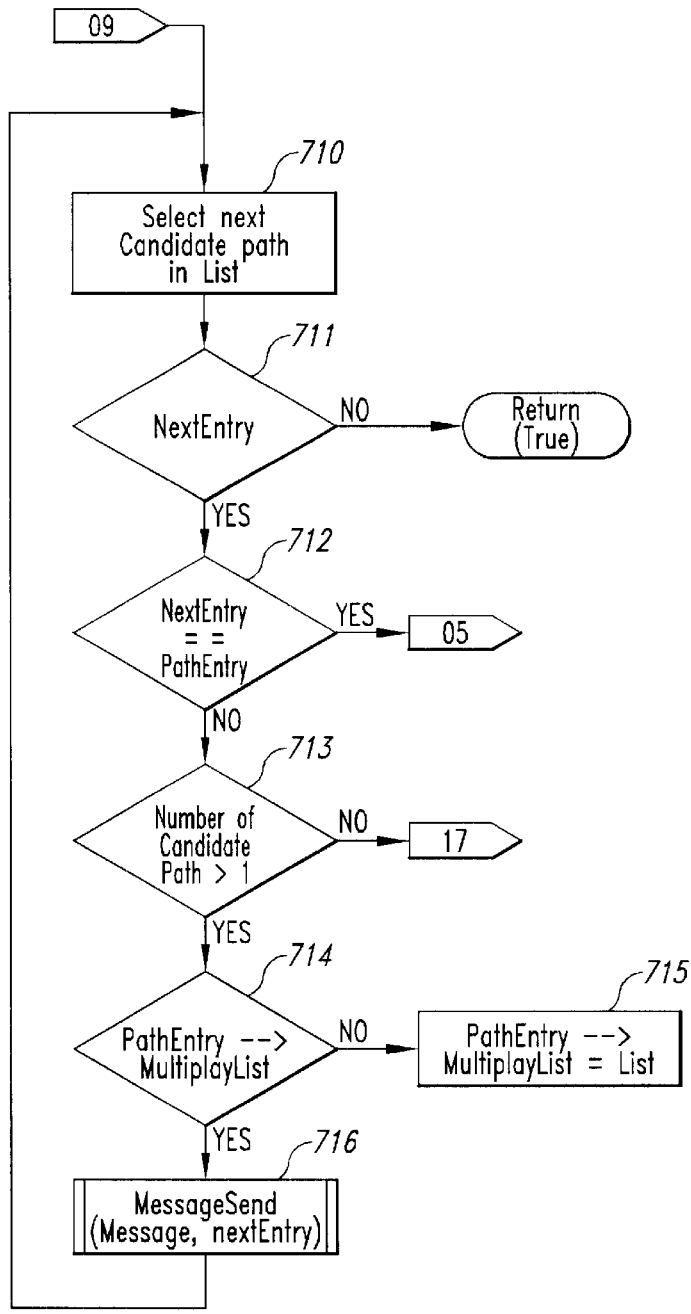
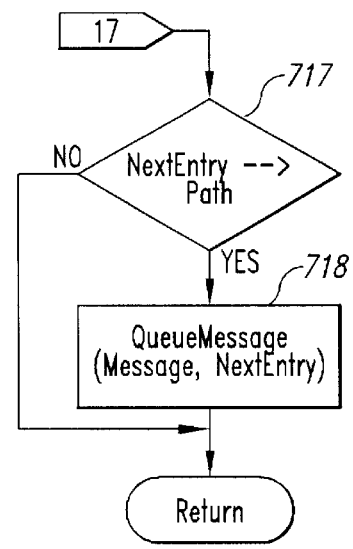
Fig. 7B
Fig. 7C

METHOD AND SYSTEM FOR DEMULTIPLEXING A FIRST SEQUENCE OF PACKET COMPONENTS TO IDENTIFY SPECIFIC COMPONENTS WHEREIN SUBSEQUENT COMPONENTS ARE PROCESSED WITHOUT RE-IDENTIFYING COMPONENTS

TECHNICAL FIELD

The present invention relates generally to a computer system for data demultiplexing.

BACKGROUND

Computer systems, which are becoming increasingly pervasive, generate data in a wide variety of formats. The Internet is an example of interconnected computer systems that generate data in many different formats. Indeed, when data is generated on one computer system and is transmitted to another computer system to be displayed, the data may be converted in many different intermediate formats before it is eventually displayed. For example, the generating computer system may initially store the data in a bitmap format. To send the data to another computer system, the computer system may first compress the bitmap data and then encrypt the compressed data. The computer system may then convert that compressed data into a TCP format and then into an IP format. The IP formatted data may be converted into a transmission format, such as an ethernet format. The data in the transmission format is then sent to a receiving computer system. The receiving computer system would need to perform each of these conversions in reverse order to convert the data in the bitmap format. In addition, the receiving computer system may need to convert the bitmap data into a format that is appropriate for rendering on output device.

In order to process data in such a wide variety of formats, both sending and receiving computer systems need to have many conversion routines available to support the various formats. These computer systems typically use predefined configuration information to load the correct combination of conversion routines for processing data. These computer systems also use a process-oriented approach when processing data with these conversion routines. When using a process-oriented approach, a computer system may create a separate process for each conversion that needs to take place. A computer system in certain situations, however, can be expected to receive data and to provide data in many different formats that may not be known until the data is received. The overhead of statically providing each possible series of conversion routines is very high. For example, a computer system that serves as a central controller for data received within a home would be expected to process data received via telephone lines, cable TV lines, and satellite connections in many different formats. The central controller would be expected to output the data to computer displays, television displays, entertainment centers, speakers, recording devices, and so on in many different formats. Moreover, since the various conversion routines may be developed by different organizations, it may not be easy to identify that the output format of one conversion routine is compatible with the input format of another conversion routine.

It would be desirable to have a technique for dynamically identifying a series of conversion routines for processing data. In addition, it would be desirable to have a technique in which the output format of one conversion routine can be identified as being compatible with the input format of another conversion routine. It would also be desirable to store the identification of a series of conversion routines so that the series can be quickly identified when data is received.

BRIEF DESCRIPTION OF THE DRAWINGS

FIGS. 7A, 7B, and 7C comprise a flow diagram illustrating the processing of the message send routine.

DETAILED DESCRIPTION

Figure 1:
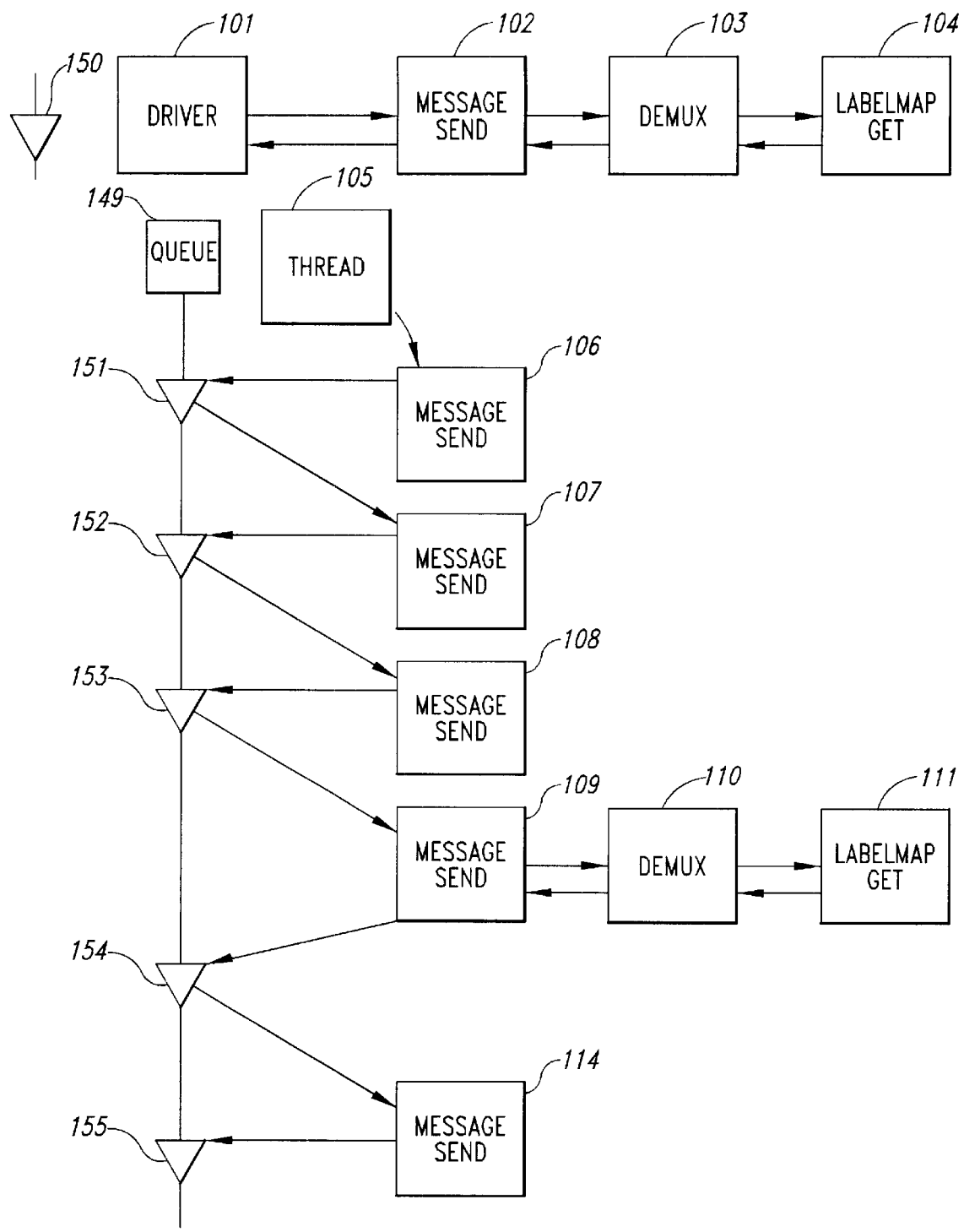
FIG. 1 is a block diagram illustrating example processing of a message by the conversion system.

A method and system for converting a message that may contain multiple packets from an source format into a target format. When a packet of a message is received, the conversion system in one embodiment searches for and identifies a sequence of conversion routines (or more generally message handlers) for processing the packets of the message by comparing the input and output formats of the conversion routines. (A message is a collection of data that is related in some way, such as stream of video or audio data or an email message.) The identified sequence of conversion routines is used to convert the message from the source format to the target format using various intermediate formats. The conversion system then queues the packet for processing by the identified sequence of conversion routines. The conversion system stores the identified sequence so that the sequence can be quickly found (without searching) when the next packet in the message is received. When subsequent packets of the message are received, the conversion system identifies the sequence and queues the packets for pressing by the sequence. Because the conversion system receives multiple messages with different source and target formats and identifies a sequence of conversion routines for each message, the conversion systems effectively "demultiplexes" the messages. That is, the conversion system demultiplexes the messages by receiving the message, identifying the sequence of conversion routines, and controlling the processing of each message by the identified sequence. Moreover, since the conversion routines may need to retain state information between the receipt of one packet of a message and the next packet of that message, the conversion system maintains state information as an instance or session of the conversion routine. The conversion system routes all packets for a message through the same session of each conversion routine so that the same state or instance information can be used by all packets of the message. A sequence of sessions of conversion routines is referred to as a "path." In one embodiment, each path has a path thread associated with it for processing of each packet destined for that path.

In one embodiment, the packets of the messages are initially received by "drivers," such as an Ethernet driver. When a driver receives a packet, it forwards the packet to a forwarding component of the conversion system. The forwarding component is responsible for identifying the session of the conversion routine that should next process the packet and invoking that conversion routine. When invoked by a driver, the forwarding component may use a demultiplexing ("demux") component to identify the session of the first conversion routine of the path that is to process the packet and then queues the packet for processing by the path. A path thread is associated with each path. Each path thread is responsible for retrieving packets from the queue of its path and forwarding the packets to the forwarding component. When the forwarding component is invoked by a path thread, it initially invokes the first conversion routine in the path. That conversion routine processes the packet and forwards the processed packet to the forwarding component, which then invokes the second conversion routine in the path. The process of invoking the conversion routines and forwarding the processed packet to the next conversion routine continues until the last conversion routine in the path is invoked. A conversion routine may defer invocation of the forwarding component until it aggregates multiple packets or may invoke the forwarding component multiple times for a packet once for each sub-packet.

The forwarding component identifies the next conversion routine in the path using the demux component and stores that identification so that the forwarding component can quickly identify the conversion routine when subsequent packets of the same message are received. The demux component searches for the conversion routine and session that is to next process a packet. The demux component then stores the identification of the session and conversion routine as part of a path data structure so that the conversion system does not need to search for the session and conversion routine when requested to demultiplex subsequent packets of the same message. When searching for the next conversion routine, the demux component invokes a label map get component that identifies the next conversion routine. Once the conversion routine is found, the demux component identifies the session associated with that message by, in one embodiment, invoking code associated with the conversion routine. In general, the code of the conversion routine determines what session should be associated with a message. In certain situations, multiple messages may share the same session. The demux component then extends the path for processing that packet to include that session and conversion routine. The sessions are identified so that each packet is associated with the appropriate state information. The dynamic identification of conversion routines is described in U.S. patent application Ser. No. 09/304,973, filed on May 4, 1999, entitled "Method and System for Generating a Mapping Between Types of Data," which is hereby incorporated by reference.

FIG. 1 is a block diagram illustrating example processing of a message by the conversion system. The driver 101 receives the packets of the message from a network. The driver performs any appropriate processing of the packet and invokes a message send routine passing the processed packet along with a reference path entry 150. The message send routine is an embodiment of the forwarding component. A path is represented by a series of path entries, which are represented by triangles. Each member path entry represents a session and conversion routine of the path, and a reference path entry represents the overall path. The passed reference path entry 150 indicates to the message send routine that it is being invoked by a driver. The message send routine invokes the demux routine 102 to search for and identify the path of sessions that is to process the packet. The demux routine may in turn invoke the label map get routine 104 to identify a sequence of conversion routines for processing the packet. In this example, the label map get routine identifies the first three conversion routines, and the demux routine creates the member path entries 151, 152, 153 of the path for these conversion routines. Each path entry identifies a session for a conversion routine, and the sequence of path entries 151–155 identifies a path. The message send routine then queues the packet on the queue 149 for the path that is to process the packets of the message. The path thread 105 for the path retrieves the packet from the queue and invokes the message send routine 106 passing the packet and an indication of the path. The message send routine determines that the next session and conversion routine as indicated by path entry 151 has already been found. The message send routine then invokes the instance of the conversion routine for the session. The conversion routine processes the packet and then invokes the message send routine 107. This processing continues until the message send routine invokes the demux routine 110 after the packet is processed by the conversion routine represented by path entry 153. The demux routine examines the path and determines that it has no more path entries. The demux routine then invokes the label map get routine 111 to identify the conversion routines for further processing of the packet. When the conversion routines are identified, the demux routine adds path entries 154, 155 to the path. The messages send routine invokes the conversion routine associated with path entry 154. Eventually, the conversion routine associated with path entry 155 performs the final processing for the path.

Figure 2:
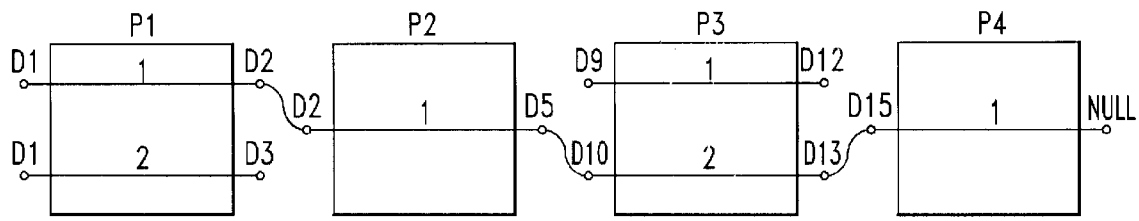
FIG. 2 is a block diagram illustrating a sequence of edges.

The label map get routine identifies a sequence of "edges" for converting data in one format into another format. Each edge corresponds to a conversion routine for converting data from one format to another. Each edge is part of a "protocol" (or more generally a component) that may include multiple related edges. For example, a protocol may have edges that each convert data in one format into several different formats. Each edge has an input format and an output format. The label map get routine identifies a sequence of edges such that the output format of each edge is compatible with the input format of another edge in the sequence, except for the input format of the first edge in the sequence and the output format of the last edge in the sequence. FIG. 2 is a block diagram illustrating a sequence of edges. Protocol P1 includes an edge for converting format D1 to format D2 and an edge for converting format D1 to format D3; protocol P2 includes an edge for converting format D2 to format D5, and so on. A sequence for converting format D1 to format D15 is shown by the curved lines and is defined by the address "P1:1, P2:1, P3:2, P4:7." When a packet of data in format D1 is processed by this sequence, it is converted to format D15. During the process, the packet of data is sequentially converted to format D2, D5, and D13. The output format of protocol P2, edge 1 (i.e., P2:1) is format D5, but the input format of P3:2 is format D10. The label map get routine uses an aliasing mechanism by which two formats, such as D5 and D10 are identified as being compatible. The use of aliasing allows different names of the same format or compatible formats to be correlated.

Figure 3:
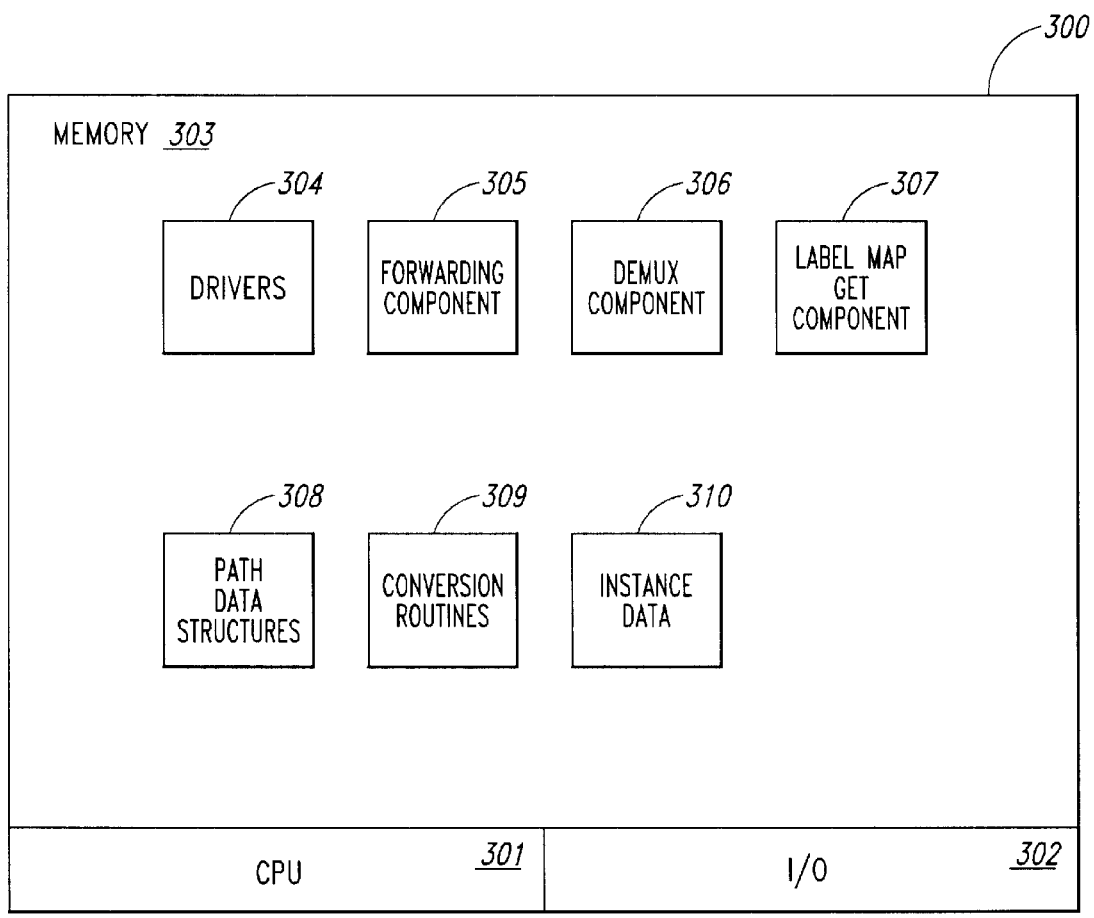
FIG. 3 is a block diagram illustrating components of the conversion system in one embodiment.

FIG. 3 is a block diagram illustrating components of the conversion system in one embodiment. The conversion system 300 can operate on a computer system with a central processing unit 301, I/O devices 302, and memory 303. The I/O devices may include an Internet connection, a connection to various output devices such as a television, and a connection to various input devices such as a television receiver. The media mapping system may be stored as instructions on a computer-readable medium, such as a disk drive, memory, or data transmission medium. The data structures of the media mapping system may also be stored on a computer-readable medium. The conversion system includes drivers 304, a forwarding component 305, a demux component 306, a label map get component 307, path data structures 308, conversion routines 309, and instance data 310. Each driver receives data in a source format and forwards the data to the forwarding component. The forwarding component identifies the next conversion routine in the path and invokes that conversion routine to process a packet. The forwarding component may invoke the demux component to search for the next conversion routine and add that conversion routine to the path. The demux component may invoke the label map get component to identify the next conversion routine to process the packet. The demux component stores information defining the paths in the path structures. The conversion routines store their state information in the instance data.

Figure 4:
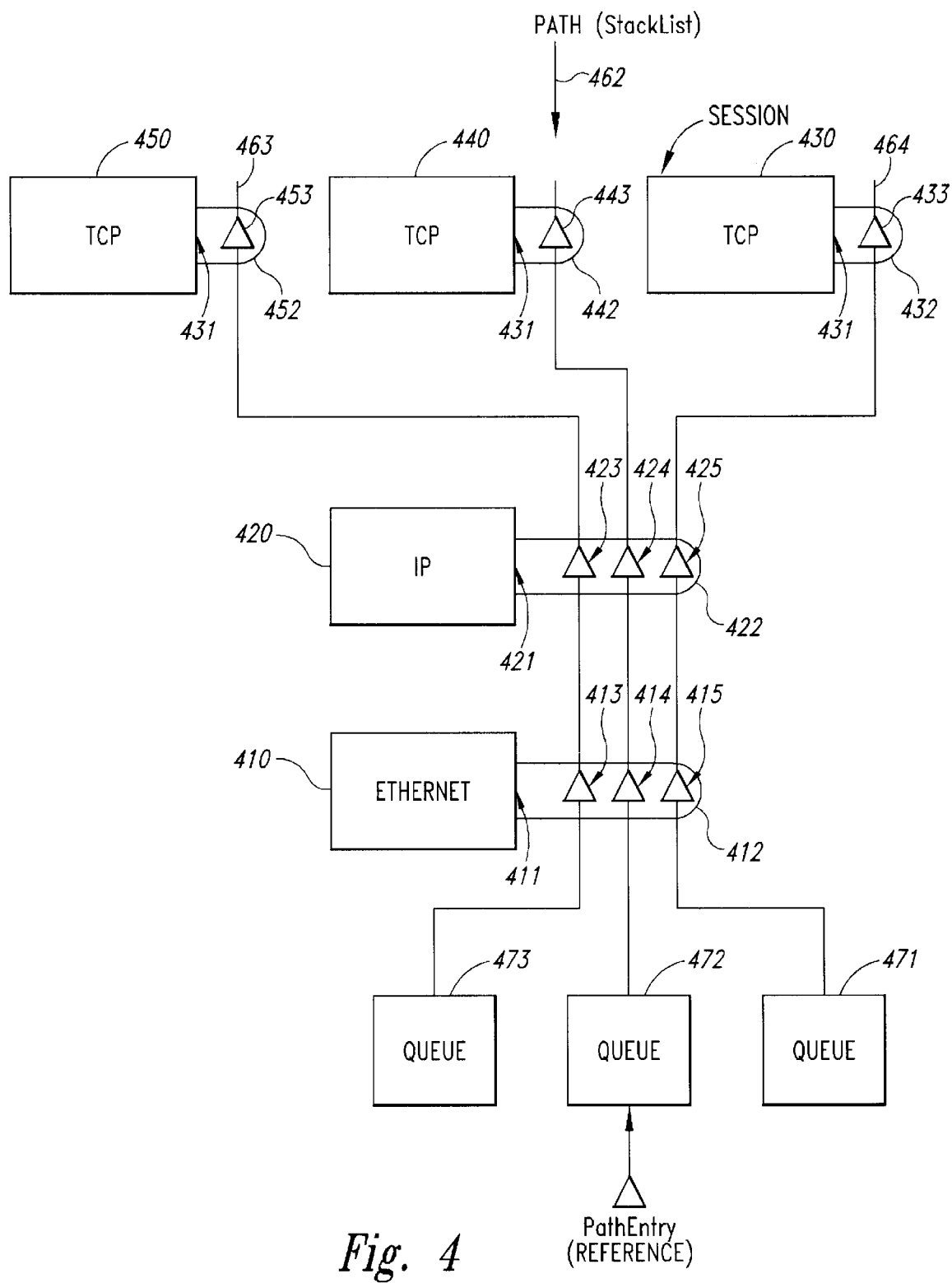
FIG. 4 is a block diagram illustrating example path data structures in one embodiment.

FIG. 4 is a block diagram illustrating example path data structures in one embodiment. The demux component identifies a sequence of "edges" for converting data in one format into another format by invoking the label map get component. Each edge corresponds to a conversion routine for converting data from one format to another. As discussed above, each edge is part of a "protocol" that may include multiple related edges. For example, a protocol may have edges that each convert data in one format into several different formats. Each edge has as an input format ("input label") and an output format ("output label"). Each rectangle represents a session 410, 420, 430, 440, 450 for a protocol. A session corresponds to an instance of a protocol. That is, the session includes the protocol and state information associated with that instance of the protocol. Session 410 corresponds to a session for an Ethernet protocol; session 420 corresponds to a session for an IP protocol; and sessions 430, 440, 450 correspond to sessions for a TCP protocol. FIG. 4 illustrates three paths 461, 462, 463. Each path includes edges 411, 421, 431. The paths share the same Ethernet session 410 and IP session 420, but each path has a unique TCP session 430, 440, 450. Thus, path 461 includes sessions 410, 420, and 430; path 462 includes sessions 410, 420, and 440; and path 463 includes sessions 410, 420, and 450. The conversion system represents each path by a sequence of path entry structures. Each path entry structure is represented by a triangle. Thus, path 461 is represented by path entries 415, 425, and 433. The conversion system represents the path entries of a path by a stack list. Each path also has a queue 471, 472, 473 associated with it. Each queue stores the messages that are to be processed by the conversion routines of the edges of the path. Each session includes a binding 412, 422, 432, 442, 452 that is represented by an oblong shape adjacent to the corresponding edge. A binding for an edge of a session represents those paths that include the edge. The binding 412 indicates that three paths are bound (or "nailed") to edge 411 of the Ethernet session 410. The conversion system uses a path list to track the paths that are bound to a binding. The path list of binding 412 identifies path entries 413, 414, and 415.

Figure 5:
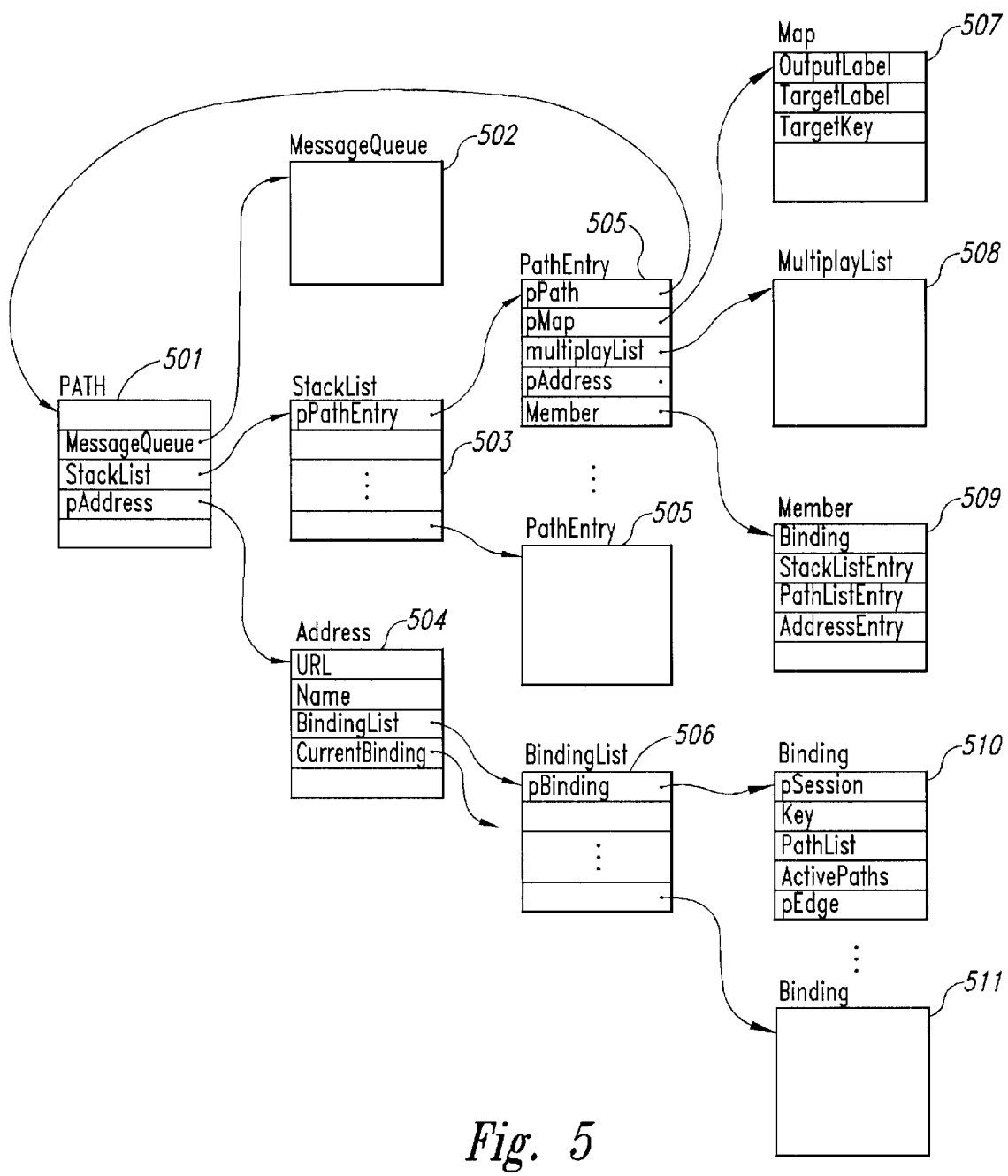
FIG. 5 is a block diagram that illustrates the interrelationship of the data structures of a path.

FIG. 5 is a block diagram that illustrates the interrelationship of the data structures of a path. Each path has a corresponding path structure 501 that contains status information and pointers to a message queue structure 502, a stack list structure 503, and a path address structure 504. The status of a path can be extend, continue, or end. Each message handler returns a status for the path. The status of extend means that additional path entries should be added to the path. The status of end means that this path should end at this point and subsequent processing should continue at a new path. The status of continue means that the protocol does not care how the path is handled. In one embodiment, when a path has a status of continue, the system creates a copy of the path and extends the copy. The message queue structure identifies the messages (or packets of a message) that are queued up for processing by the path and identifies the path entry at where the processing should start. The stack list structure contains a list of pointers to the path entry structures 505 that comprise the path. Each path entry structure contains a pointer to the corresponding path data structure, a pointer to a map structure 507, a pointer to a multiplex list 508, a pointer to the corresponding path address structure, and a pointer to a member structure 509. A map structure identifies the output label of the edge of the path entry and optionally a target label and a target key. A target key identifies the session associated with the protocol that converts the packet to the target label. (The terms "media," "label," and "format" are used interchangeably to refer to the output of a protocol.) The multiplex list is used during the demux process to track possible next edges when a path is being identified as having more than one next edge. The member structure indicates that the path entry represents an edge of a path and contains a pointer to a binding structure to which the path entry is associated (or "nailed"), a stack list entry is the position of the path entry within the associated stack list, a path list entry is the position of the path entry within the associated path list of a binding and an address entry is the position of the binding within the associated path address. A path address of a path identifies the bindings to which the path entries are bound. The path address structure contains a URL for the path, the name of the path identified by the address, a pointer to a binding list structure 506, and the identification of the current binding within the binding list. The URL (e.g., "protocol://tcp(0)/ip (0)/eth(0)") identifies conversion routines (e.g., protocols and edges) of a path in a human-readable format. The URL (universal resource locator) includes a type field (e.g., "protocol") followed by a sequence of items (e.g., "tcp(0)"). The type field specifies the format of the following information in the URL, that specifies that the type field is followed by a sequence of items. Each item identifies a protocol and an edge (e.g., the protocol is "tcp" and the edge is "0"). In one embodiment, the items of a URL may also contain an identifier of state information that is to be used when processing a message. These URLs can be used to illustrate to a user various paths that are available for processing a message. The current binding is the last binding in the path as the path is being built. The binding list structure contains a list of pointers to the binding structures associated with the path. Each binding structure 510 contains a pointer to a session structure, a pointer to an edge structure, a key, a path list structure, and a list of active paths through the binding. The key identifies the state information for a session of a protocol. A path list structure contains pointers to the path entry structures associated with the binding.

Figure 6:
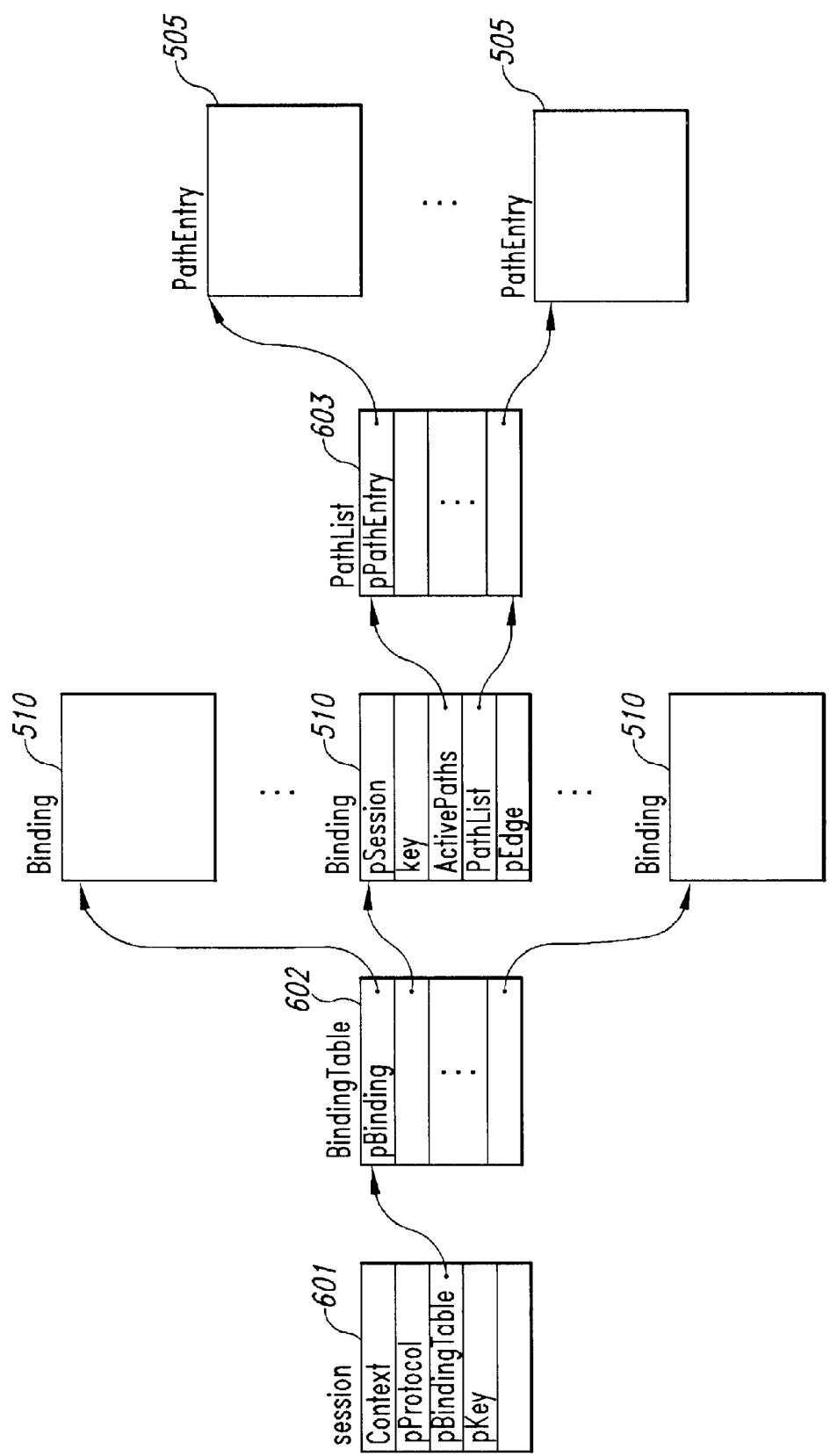
FIG. 6 is a block diagram that illustrates the interrelationship of the data structures associated with a session.

FIG. 6 is a block diagram that illustrates the interrelationship of the data structures associated with a session. A session structure 601 contains the context for the session, a pointer to a protocol structure for the session, a pointer to a binding table structure 602 for the bindings associated with the session, and the key. The binding table structure contains a list of pointers to the binding structures 510 for the session. The binding structure is described above with reference to FIG. 5. The path list structure 603 of the binding structure contains a list of pointers to path entry structures 505. The path entry structures are described with reference to FIG. 5.

Figure 7A:
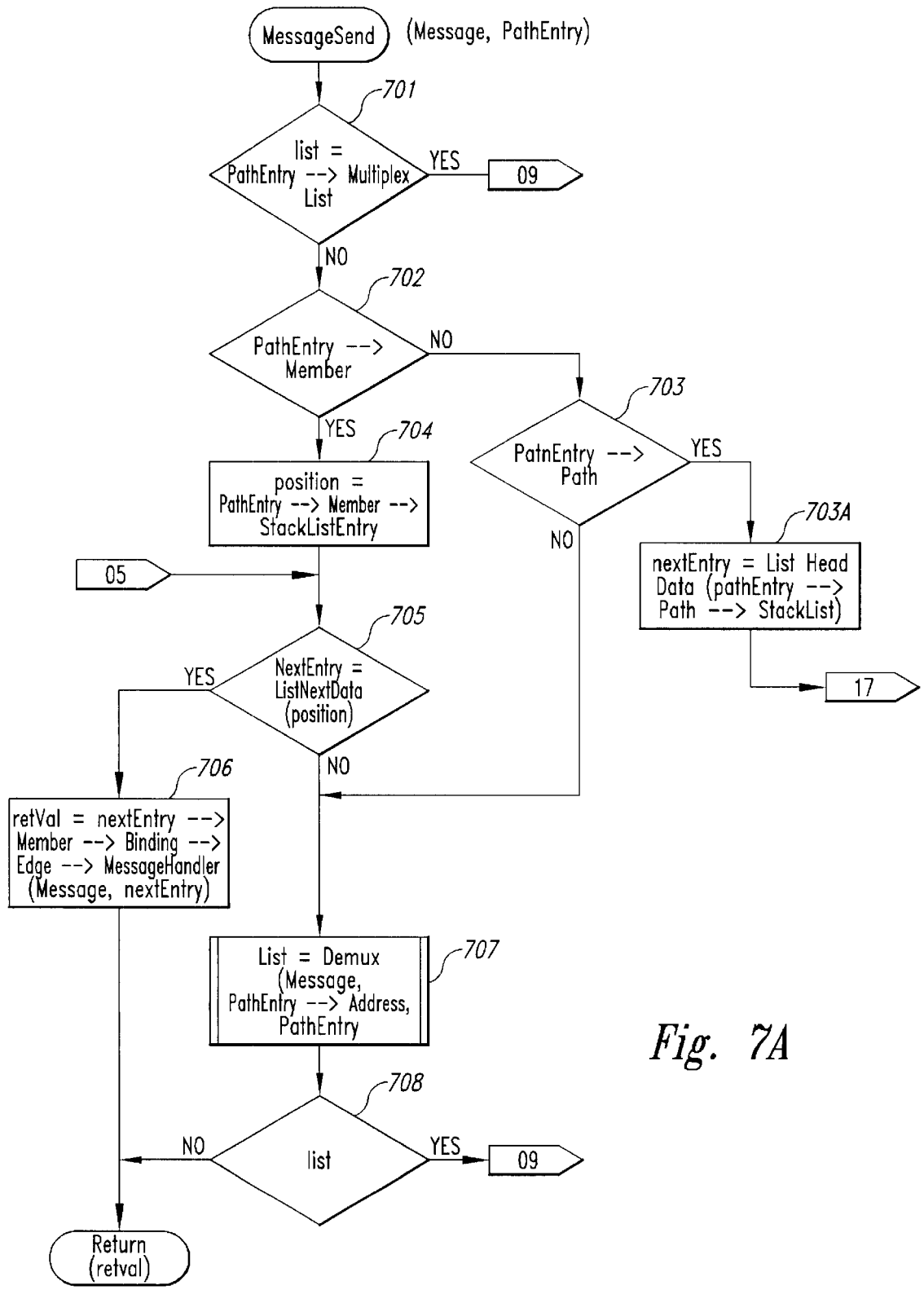

FIGS. 7A, 7B, and 7C comprise a flow diagram illustrating the processing of the message send routine. The message send routine is passed a message along with the path entry associated with the session that last processed the message. The message send routine invokes the message handler of the next edge in the path or queues the message for processing by a path. The message handler invokes the demux routine to identify the next path entry of the path. When a driver receives a message, it invokes the message send routine passing a reference path entry. The message send routine examines the passed path entry to determine (1) whether multiple paths branch from the path of the passed path entry, (2) whether the passed path entry is a reference with an associated path, or (3) whether the passed path entry is a member with a next path entry. If multiple paths branch from the path of the passed path entry, then the routine recursively invokes the message send routine for each path. If the path entry is a reference with an associated path, then the driver previously invoked the message send routine, which associated a path with the reference path entry, and the routine places the message on the queue for the path. If the passed path entry is a member with a next path entry, then the routine invokes the message handler (i.e., conversion routine of the edge) associated with the next path entry. If the passed path entry is a reference without an associated path or is a member without a next path entry, then the routine invokes the demux routine to identify the next path entry. The routine then recursively invokes the messages send routine passing that next path entry. In decision block 701, if the passed path entry has a multiplex list, then the path branches off into multiple paths and the routine continues at block 709, else the routine continues at block 702. A packet may be processed by several different paths. For example, if a certain message is directed to two different output devices, then the message is processed by two different paths. Also, a message may need to be processed by multiple partial paths when searching for a complete path. In decision block 702, if the passed path entry is a member, then either the next path entry indicates a nailed binding or the path needs to be extended and the routine continues at block 704, else the routine continues at block 703. A nailed binding is a binding (e.g., edge and protocol) is associated with a session. In decision block 703, the passed path entry is a reference and if the passed path entry has an associated path, then the routine can queue the message for the associated path and the routine continues at block 703A, else the routine needs to identify a path and the routine continues at block 707. In block 703A, the routine sets the entry to the first path entry in the path and continues at block 717. In block 704, the routine sets the variable position to the stack list entry of the passed path entry. In decision block 705, the routine sets the variable next entry to the next path entry in the path. If there is a next entry in the path, then the next session and edge of the protocol have been identified and the routine continues at block 706, else the routine continues at block 707. In block 706, the routine passes the message to the message handler of the edge associated with the next entry and then returns. In block 706, the routine invokes the demux routine passing the passed message, the address of the passed path entry, and the passed path entry. The demux routine returns a list of candidate paths for processing of the message. In decision block 708, if at least one candidate path is returned, then the routine continues at block 709, else the routine returns.

Blocks 709–716 illustrate the processing of a list of candidate paths that extend from the passed path entry. In blocks 710–716, the routine loops selecting each candidate path and sending the message to be process by each candidate path. In block 710, the routine sets the next entry to the first path entry of the next candidate path. In decision block 711, if all the candidate paths have not yet been processed, then the routine continues at block 712, else the routine returns. In decision block 712, if the next entry is equal to the passed path entry, then the path is to be extended and the routine continues at block 705, else the routine continues at block 713. The candidate paths include a first path entry that is a reference path entry for new paths or that is the last path entry of a path being extended. In decision block 713, if the number of candidate paths is greater than one, then the routine continues at block 714, else the routine continues at block 718. In decision block 714, if the passed path entry has a multiplex list associated with it, then the routine continues at block 716, else the routine continues at block 715. In block 715, the routine associates the list of candidate path with the multiplex list of the passed path entry and continues at block 716. In block 716, the routine sends the message to the next entry by recursively invoking the message send routine. The routine then loops to block 710 to select the next entry associated with the next candidate path.

Blocks 717–718 are performed when the passed path entry is a reference path entry that has a path associated with it. In block 717, if there is a path associated with the next entry, then the routine continues at block 718, else the routine returns. In block 718, the routine queues the message for the path of the next entry and then returns.

Figure 8:
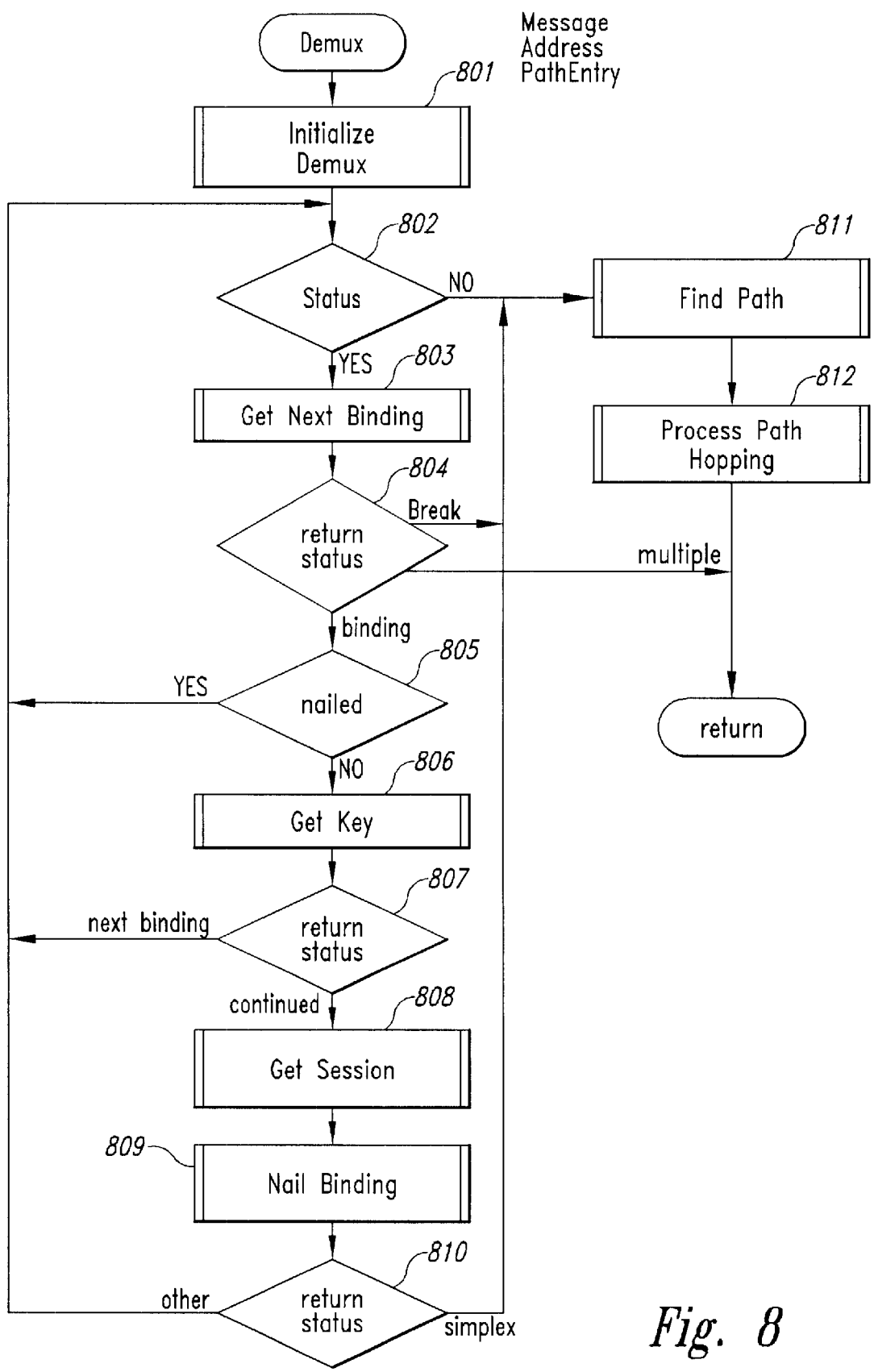
FIG. 8 is a flow diagram of the demux routine.

FIG. 8 is a flow diagram of the demux routine. This routine is passed the packet (message) that is received, an address structure, and a path entry structure. The demux routine extends a path, creating one if necessary. The routine loops identifying the next binding (edge and protocol) that is to process the message and "nailing" the binding to a session for the message, if not already nailed. After identifying the nailed binding, the routine searches for the shortest path through the nailed binding, creating a path if none exists. In block 801, the routine invokes the initialize demux routine. In blocks 802–810, the routine loops identifying a path or portion of a path for processing the passed message. In decision block 802, if there is a current status, which was returned by the demuxkey routine that was last invoked (e.g., continue, extend, end, or postpone), then the routine continues at block 803, else the routine continues at block 811. In block 803, the routine invokes the get next binding routine. The get next binding routine returns the next binding in the path. The binding is the edge of a protocol. That routine extends the path as appropriate to include the binding. The routine returns a return status of break, binding, or multiple. The return status of binding indicates that the next binding in the path was found by extending the path as appropriate and the routine continues to "nail" the binding to a session as appropriate. The return status of multiple means that multiple trails (e.g., candidate paths) were identified as possible extensions of the path. In a decision block 804, if the return status is break, then the routine continues at block 811. If the return status is multiple, then the routine returns. If the return status is binding, then the routine continues at block 805. In decision block 805, if the retrieved binding is nailed as indicated by being assigned to a session, then the routine loops to block 802, else the routine continues at block 806. In block 806, the routine invokes the get key routine of the edge associated with the binding. The get key routine creates the key for the session associated with the message. If a key cannot be created until subsequent bindings are processed or because the current binding is to be removed, then the get key routine returns a next binding status, else it returns a continue status. In decision block 807, if the return status of the get key routine is next binding, then the routine loops to block 802 to get the next binding, else the routine continues at block 808. In block 808, the routine invokes the routine get session. The routine get session returns the session associated with the key, creating a new session if necessary. In block 809, the routine invokes the routine nail binding. The routine nail binding retrieves the binding if one is already nailed to the session. Otherwise, that routine nails the binding to the session. In decision block 810, if the nail binding routine returns a status of simplex, then the routine continues at block 811 because only one path can use the session, else the routine loops to block 802. Immediately upon return from the nail binding routine, the routine may invoke a set map routine of the edge passing the session and a map to allow the edge to set its map. In block 811, the routine invokes the find path routine, which finds the shortest path through the binding list and creates a path if necessary. In block 812, the routine invokes the process path hopping routine, which determines whether the identified path is part of a different path. Path hopping occurs when, for example, IP fragments are built up along separate paths, but once the fragments are built up they can be processed by the same subsequent path.

Figure 9:
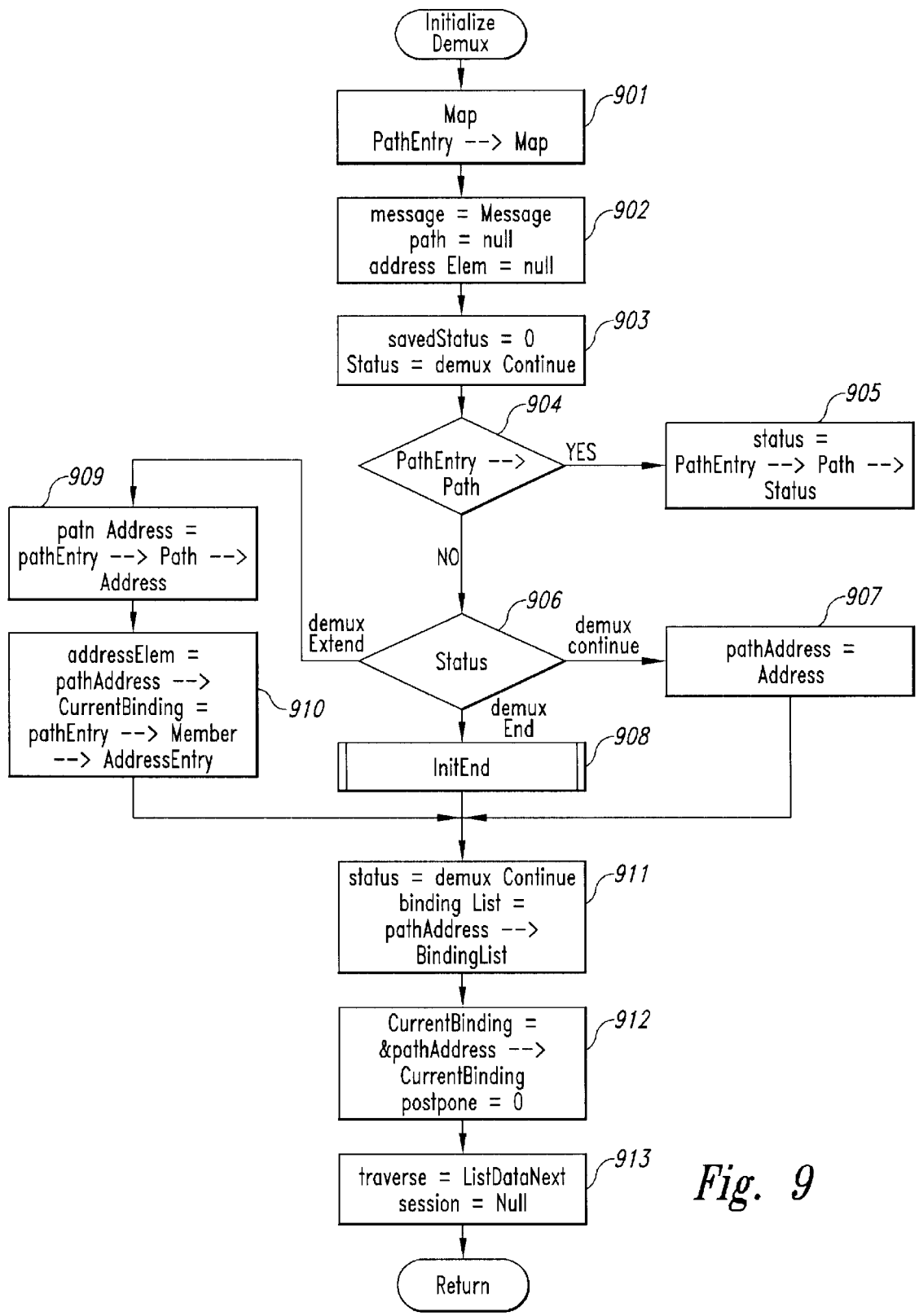
FIG. 9 is a flow diagram of the initialize demux routine.

FIG. 9 is a flow diagram of the initialize demux routine. This routine is invoked to initialize the local data structures that are used in the demux process and to identify the initial binding. The demux routine finds the shortest path from the initial binding to the final binding. If the current status is demux extend, then the routine is to extend the path of the passed path entry by adding additional path entries. If the current status is demux end, then the demux routine is ending the current path. If the current status is demux continue, then the demux routine is in the process of continuing to extend or in the process of starting a path identified by the passed address. In block 901, the routine sets the local map structure to the map structure in the passed path entry structure. The map structure identifies the output label, the target label, and the target key. In the block 902, the routine initializes the local message structure to the passed message structure and initializes the pointers path and address element to null. In block 903, the routine sets of the variable saved status to 0 and the variable status to demux continue. The variable saved status is used to track the status of the demux process when backtracking to nail a binding whose nail was,postponed. In decision block 904, if the passed path entry is associated with a path, then the routine continues at block 905, else the routine continues at block 906. In block 905, the routine sets the variable status to the status of that path. In block 906, if the variable status is demux continue, then the routine continues at block 907. If the variable status is demux end, then the routine continues at block 908. If the variable status is demux extend, then the routine continues at block 909. In block 907, the status is demux continue, and the routine sets the local pointer path address to the passed address and continues at block 91 1. In block 908, the status is demux end, and the routine invokes the init end routine and continues at block 911. In block 909, the status is demux extend, and the routine sets the local path address to the address of the path that contains the passed path entry. In block 910, the routine sets the address element and the current binding of the path address pointed to by the local pointer path address to the address entry of the member structure of the passed path entry. In the block 911, the routine sets the local variable status to demux continue and sets the local binding list structure to the binding list structure from the local path address structure. In block 912, the routine sets the local pointer current binding to the address of the current binding pointed to by local pointer path address and sets the local variable postpone to 0. In block 913, the routine sets the function traverse to the function that retrieves the next data in a list and sets the local pointer session to null. The routine then returns.

Figure 10:
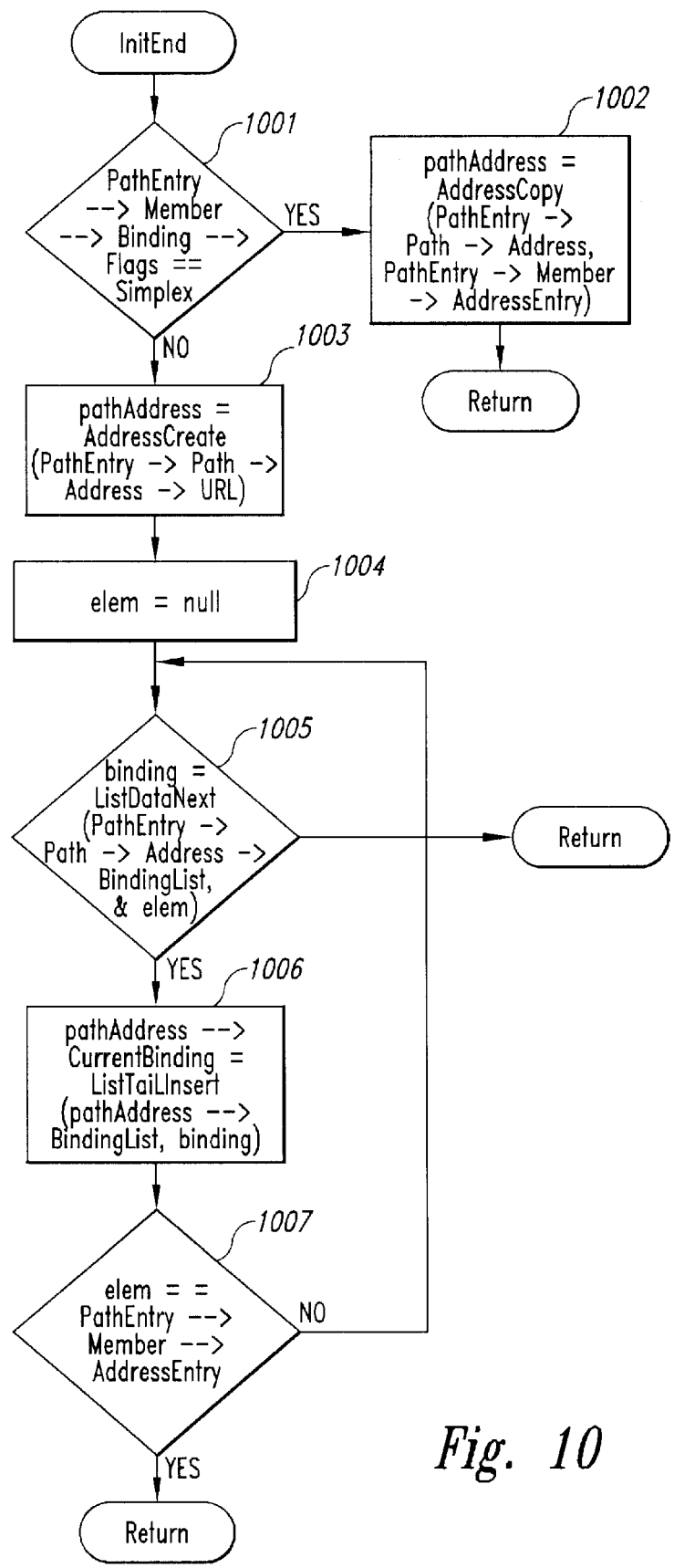
FIG. 10 is a flow diagram of the init end routine.

FIG. 10 is a flow diagram of the init end routine. If the path is simplex, then the routine creates a new path from where the other one ended, else the routine creates a copy of the path. In block 1001, if the binding of the passed path entry is simplex (i.e., only one path can be bound to this binding), then the routine continues at block 1002, else the routine continues at block 1003. In block 1002, the routine sets the local pointer path address to point to an address structure that is a copy of the address structure associated with the passed path entry structure with its current binding to the address entry associated with the passed path entry structure, and then returns. In block 1003, the routine sets the local pointer path address to point to an address structure that contains the URL of the path that contains the passed path entry. In block 1004, the routine sets the local pointer element to null to initialize the selection of the bindings. In blocks 1005 through 1007, the routine loops adding all the bindings for the address of the passed path entry that include and are before the passed path entry to the address pointed to by the local path address. In block 1005, the routine retrieves the next binding from the binding list starting with the first. If there is no such binding, then the routine returns, else the routine continues at block 1006. In block 1006, the routine adds the binding to the binding list of the local path address structure and sets the current binding of the local variable path address. In the block 1007, if the local pointer element is equal to the address entry of the passed path entry, then the routine returns, else the routine loops to block 1005 to select the next binding.

Figure 11:
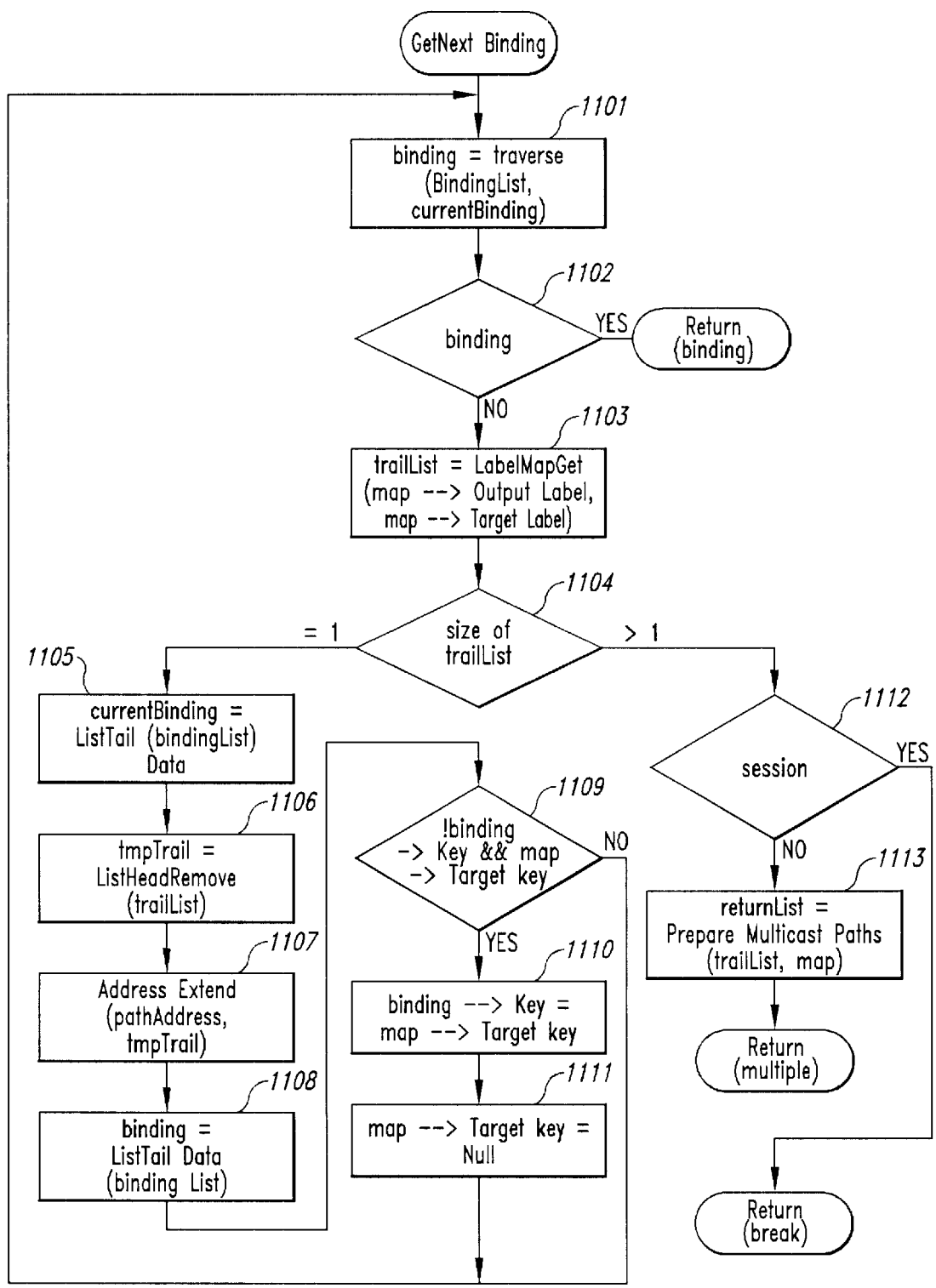
FIG. 11 is a flow diagram of a routine to get the next binding.

FIG. 11 is a flow diagram of a routine to get the next binding. This routine returns the next binding from the local binding list. If there is no next binding, then the routine invokes the routine label map get to identify the list of edges ("trails") that will map the output label to the target label. If only one trail is identified, then the binding list of path address is extended by the edges of the trail. If multiple trails are identified, then a path is created for each trail and the routine returns so that the demux process can be invoked for each created path. In block 1101, the routine sets the local pointer binding to point to the next or previous (as indicated by the traverse function) binding in the local binding list. In block 1102, if a binding was found, then the routine returns an indication that a binding was found, else the routine continues at block 1103. In block 1103, the routine invokes the label map get function passing the output label and target label of the local map structure. The label map get function returns a trail list. A trail is a list of edges from the output label to the target label. In decision block 1104, if the size of the trail list is one, then the routine continues at block 1105, else the routine continues at block 1112. In blocks 1105–1111, the routine extends the binding list by adding a binding data structure for each edge in the trail. The routine then sets the local binding to the last binding in the binding list. In block 1105, the routine sets the local pointer current binding to point to the last binding in the local binding list. In block 1106, the routine sets the local variable temp trail to the trail in the trail list. In block 1107, the routine extends the binding list by temp trail by adding a binding for each edge in the trail. These bindings are not yet nailed. In block 1108, the routine sets the local binding to point to the last binding in the local binding list. In decision block 1109, if the local binding does not have a key for a session and the local map has a target key for a session, then the routine sets the key for the binding to the target key of the local map and continues at block 1110, else the routine loops to block 1101 to retrieve the next binding in path. In block 1110, the routine sets the key of the local binding to the target key of the local map. In block 1111, the routine sets the target key of the local map to null and then loop to block 1101 to return the next binding. In decision block 1112, if the local session is set, then the demultiplexing is already in progress and the routine returns a break status. In block 1113, the routine invokes a prepare multicast paths routine to prepare a path entry for each trail in the trail list. The routine then returns a multiple status.

Figure 12:
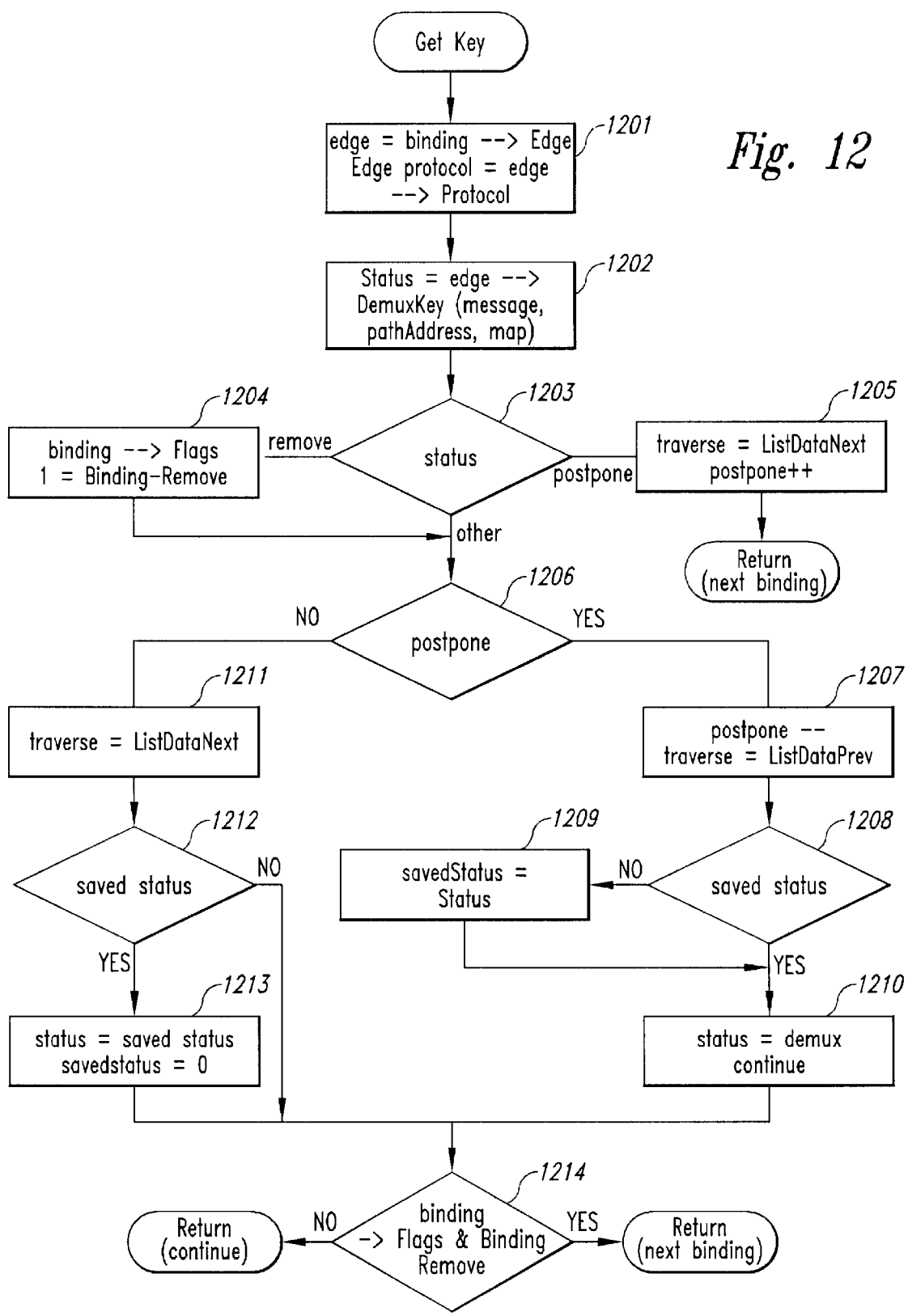
FIG. 12 is a flow diagram of the get key routine.

FIG. 12 is a flow diagram of the get key routine. The get key routine invokes an edge's demux-key routine to retrieve a key for the session associated with the message. The key identifies the session of a protocol. The demux key routine creates the appropriate key for the message. The demux key routine returns a status of remove, postpone, or other. The status of remove indicates that the current binding should be removed from the path. The status of postpone indicates that the demux key routine cannot create the key because it needs information provided by subsequent protocols in the path. For example, a TCP session is defined by a combination of a remote and local port address and an IP address. Thus, the TCP protocol postpones the creating of a key until the IP protocol identifies the IP address. The get key routine returns a next binding status to continue at the next binding in the path. Otherwise, the routine returns a continue status. In block 1201, the routine sets the local edge to the edge of the local binding (current binding) and sets the local protocol to the protocol of the local edge. In block 1202, the routine invokes the demux key routine of the local edge passing the local message, local path address, and local map. The demux key routine sets the key in the local binding. In decision block 1203, if the demux key routine returns a status of remove, then the routine continues at block 1204. If the demux key routine returns a status of postpone, then the routine continues at block 1205, else the routine continues at block 1206. In block 1204, the routine sets the flag of the local binding to indicate that the binding is to be removed and continues at block 1206. In block 1205, the routine sets the variable traverse to the function to list the next data, increments the variable postpone, and then returns a next binding status. In blocks 1206–1214, the routine processes the postponing of the creating of a key. In blocks 1207–1210, if the creating of a key has been postponed, then the routine indicates to backtrack on the path, save the demux status, and set the demux status to demux continue. In blocks 1211–1213, if the creating of a key has not been postponed, then the routine indicates to continue forward in the path and to restore any saved demux status. The save demux status is the status associated by the binding where the backtrack started. In decision block 1206, if the variable postpone is set, then the routine continues at block 1207, else the routine continues at block 1211. In block 1207, the routine decrements the variable postpone and sets the variable traverse to the list previous data function. In decision block 1208, if the variable saved status is set, then the routine continues at block 1210, else the routine continues at block 1209. The variable saved status contains the status of the demux process when the demux process started to backtrack. In block 1209, the routine sets the variable saved status to the variable status. In block 1210, the routine sets the variable status to demux continue and continues at block 1214. In block 1211, the routine sets the variable traverse to the list next data function. In decision block 1212, if the variable saved status in set, then the routine continues at block 1213, else the routine continues at block 1214. In block 1213, the routine sets the variable status to the variable saved status and sets the variable saved status to 0. In decision block 1214, if the local binding indicates that it is to be removed, then the routine returns a next binding status, else the routine returns a continue status.

Figure 13:
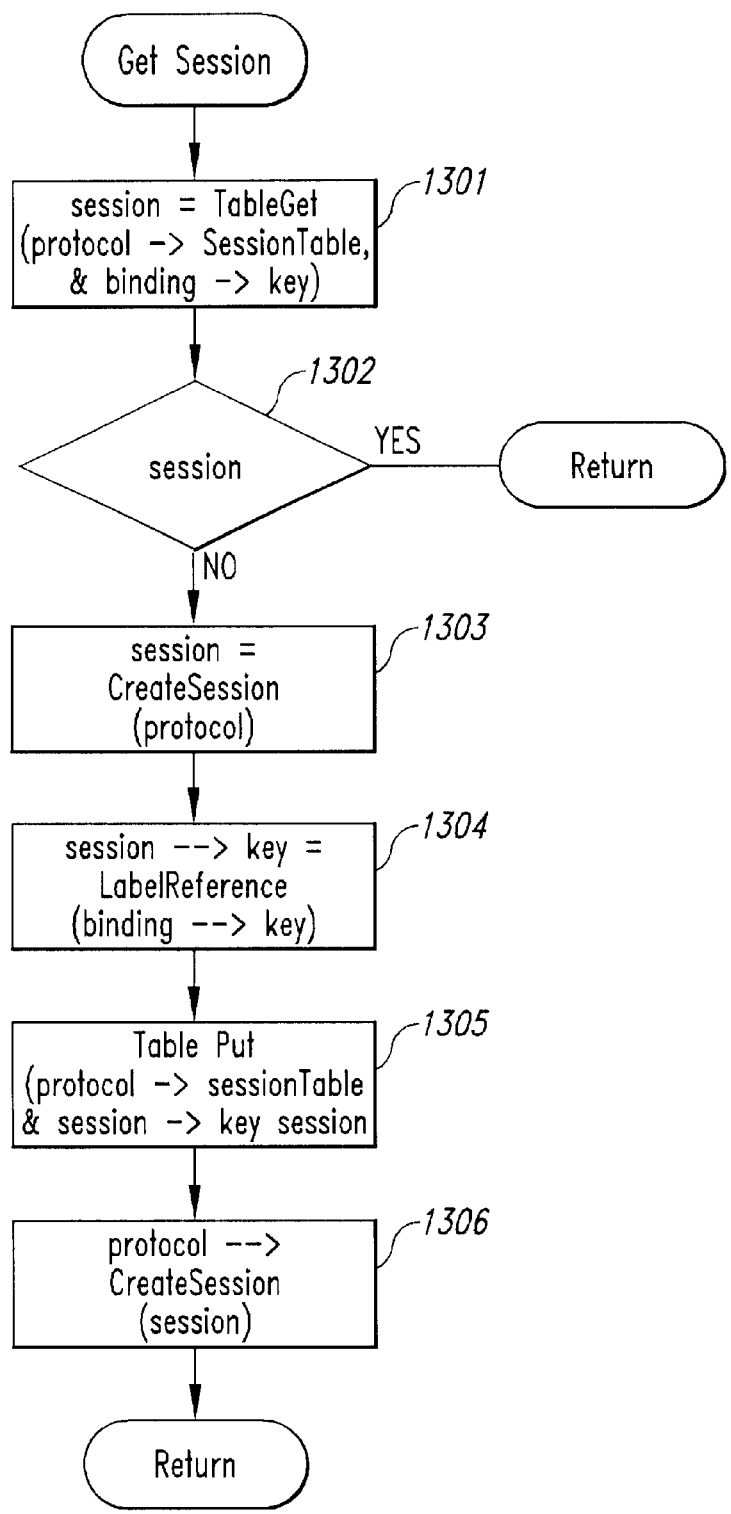
FIG. 13 is a flow diagram of the get session routine.

FIG. 13 is a flow diagram of the get session routine. This routine retrieves the session data structure, creating a data structure session if necessary, for the key indicated by the binding. In block 1301, the routine retrieves the session from the session table of the local protocol indicated by the key of the local binding. Each protocol maintains a mapping from each key to the session associated with the key. In decision block 1302, if there is no session, then the routine continues at block 1303, else the routine returns. In block 1303, the routine creates a session for the local protocol. In block 1304, the routine initializes the key for the local session based on the key of the local binding. In block 1305, the routine puts the session into the session table of the local protocol. In block 1306, the routine invokes the create session function of the protocol to allow the protocol to initialize its context and then returns.

Figure 14:
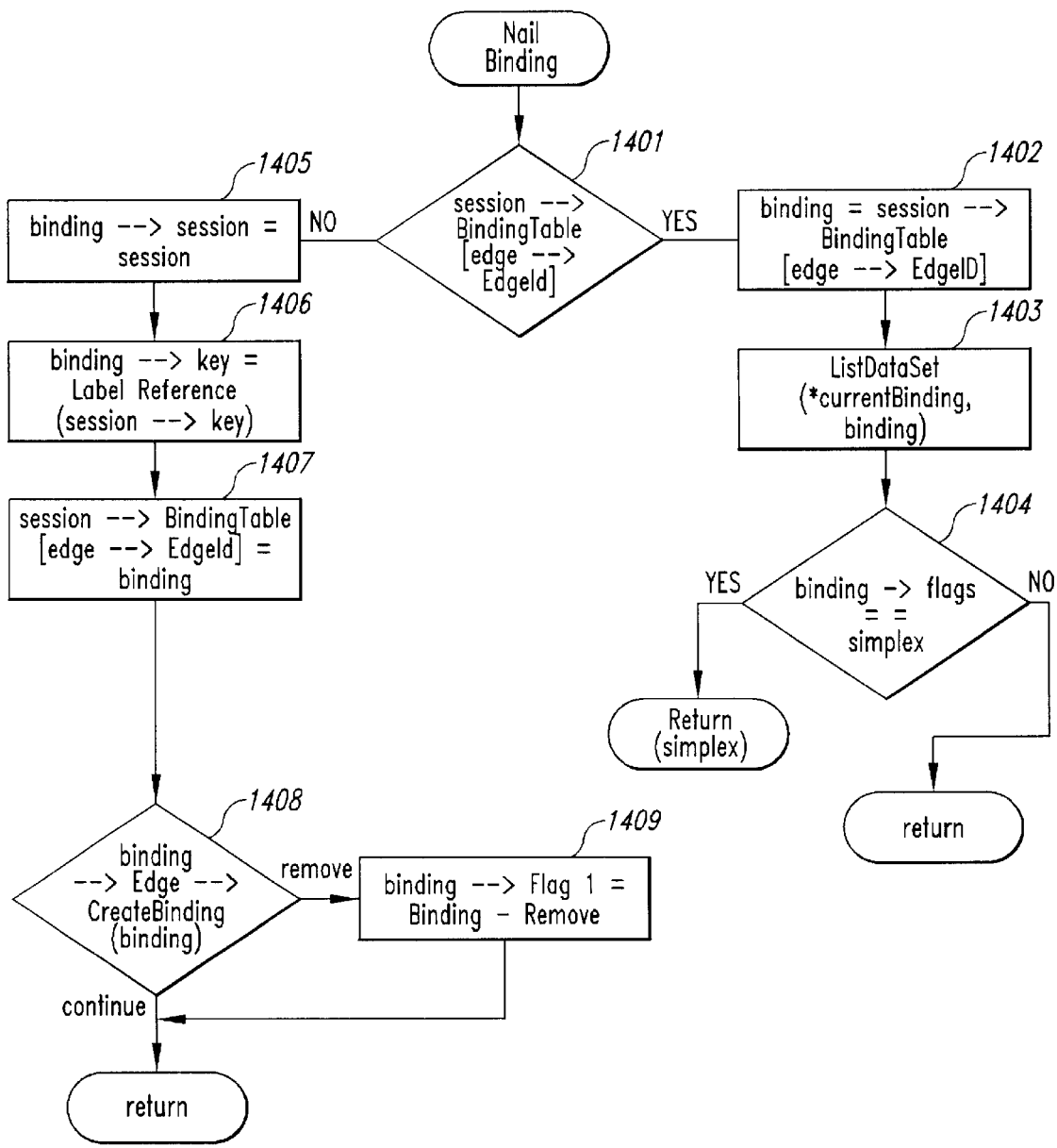
FIG. 14 is a flow diagram of the nail binding routine.

FIG. 14 is a flow diagram of the nail binding routine. This routine determines whether a binding is already associated with ("nailed to") the session. If so, the routine returns that binding. If not, the routine associates the binding with the session. The routine returns a status of simplex to indicate that only one path can extend through the nailed binding. In decision block 1401, if the binding table of the session contains an entry for the edge, then the routine continues at block 1402, else the routine continues at block 1405. In block 1402, the routine sets the binding to the entry from the binding table of the local session for the edge. In block 1403, the routine sets the current binding to point to the binding from the session. In block 1404, if the binding is simplex, then the routine returns a simplex status, else the routine returns. Blocks 1405 through 1410 are performed when there is no binding in the session for the edge. In block 1405, the routine sets the session of the binding to the variable session. In block 1406, the routine sets the key of the binding to the key from the session. In block 1407, the routine sets the entry for the edge in the binding table of the local session to the binding. In block 1408, the routine invokes the create binding function of the edge of the binding passing the binding so the edge can initialize the binding. If that function returns a status of remove, the routine continues at block 1469. In block 1409, the routine sets the binding to be removed and then returns.

Figure 15:
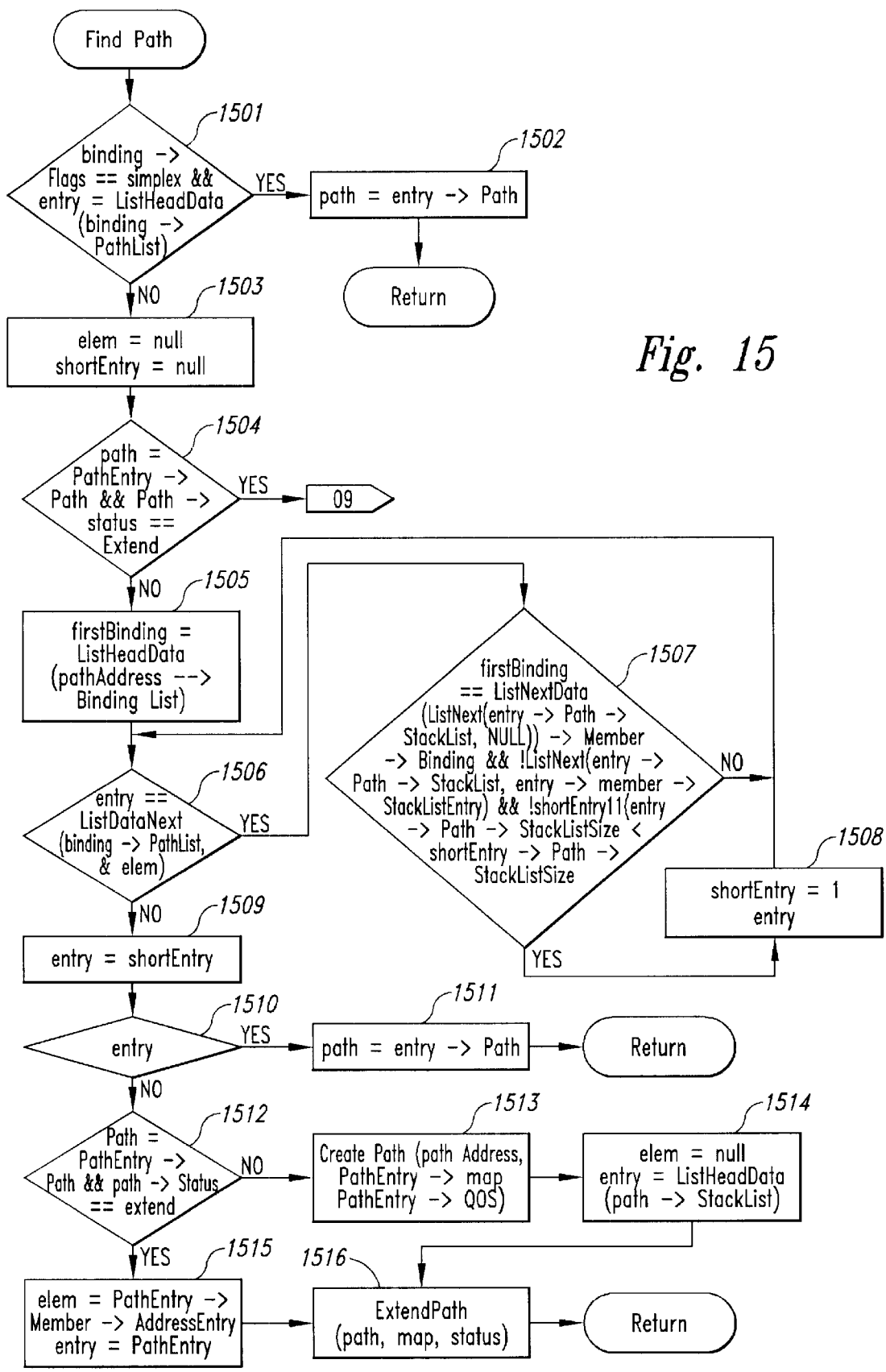
FIG. 15 is a flow diagram of the find path routine.

FIG. 15 is a flow diagram of the find path routine. The find path routine identifies the shortest path through the binding list. If no such path exists, then the routine extends a path to include the binding list. In decision block 1501, if the binding is simplex and a path already goes through this binding (returned as an entry), then the routine continues at block 1502, else the routine continues at block 1503. In block 1502, the routine sets the path to the path of the entry and returns. In block 1503, the routine initializes the pointers element and short entry to null. In block 1504, the routine sets the path to the path of the passed path entry. If the local path is not null and its status is demux extend, then the routine continues at block 1509, else the routine continues at block 1505. In blocks 1505–1508, the routine loops identifying the shortest path through the bindings in the binding list. The routine loops selecting each path through the binding. The selected path is eligible if it starts at the first binding in the binding list and the path ends at the binding. The routine loops setting the short entry to the shortest eligible path found so far. In block 1505, the routine sets the variable first binding to the first binding in the binding list of the path address. In block 1506, the routine selects the next path (entry) in the path list of the binding starting with the first. If a path is selected (indicating that there are more paths in the binding), then the routine continues at block 1507, else the routine continues at block 1509. In block 1507, the routine determines whether the selected path starts at the first binding in the binding list, whether the selected path ends at the last binding in the binding list, and whether the number of path entries in the selected path is less than the number of path entries in the shortest path selected so far. If these conditions are all satisfied, then the routine continues at block 1508, else the routine loops to block 1506 to select the next path (entry). In block 1508, the routine sets the shortest path (short entry) to the selected path and loops to block 1506 to select the next path through the binding. In block 1509, the routine sets the selected path (entry) to the shortest path. In decision block 1510, if a path has been found, then the routine continues at block 1511, else the routine continues at block 1512. In block 1511, the routine sets the path to the path of the selected path entry and returns. Blocks 1512–1516 are performed when no paths have been found. In block 1512, the routine sets the path to the path of the passed path entry. If the passed path entry has a path and its status is demux extend, then the routine continues at block 1515, else the routine continues at block 1513. In block 1513, the routine creates a path for the path address. In block 1514, the routine sets the variable element to null and sets the path entry to the first element in the stack list of the path. In block 1515, the routine sets the variable element to be address entry of the member of the passed path entry and sets the path entry to the passed path entry. In block 1516, the routine invokes the extend path routine to extend the path and then returns. The extend path routine creates a path through the bindings of the binding list and sets the path status to the current demux status.

Figure 16:
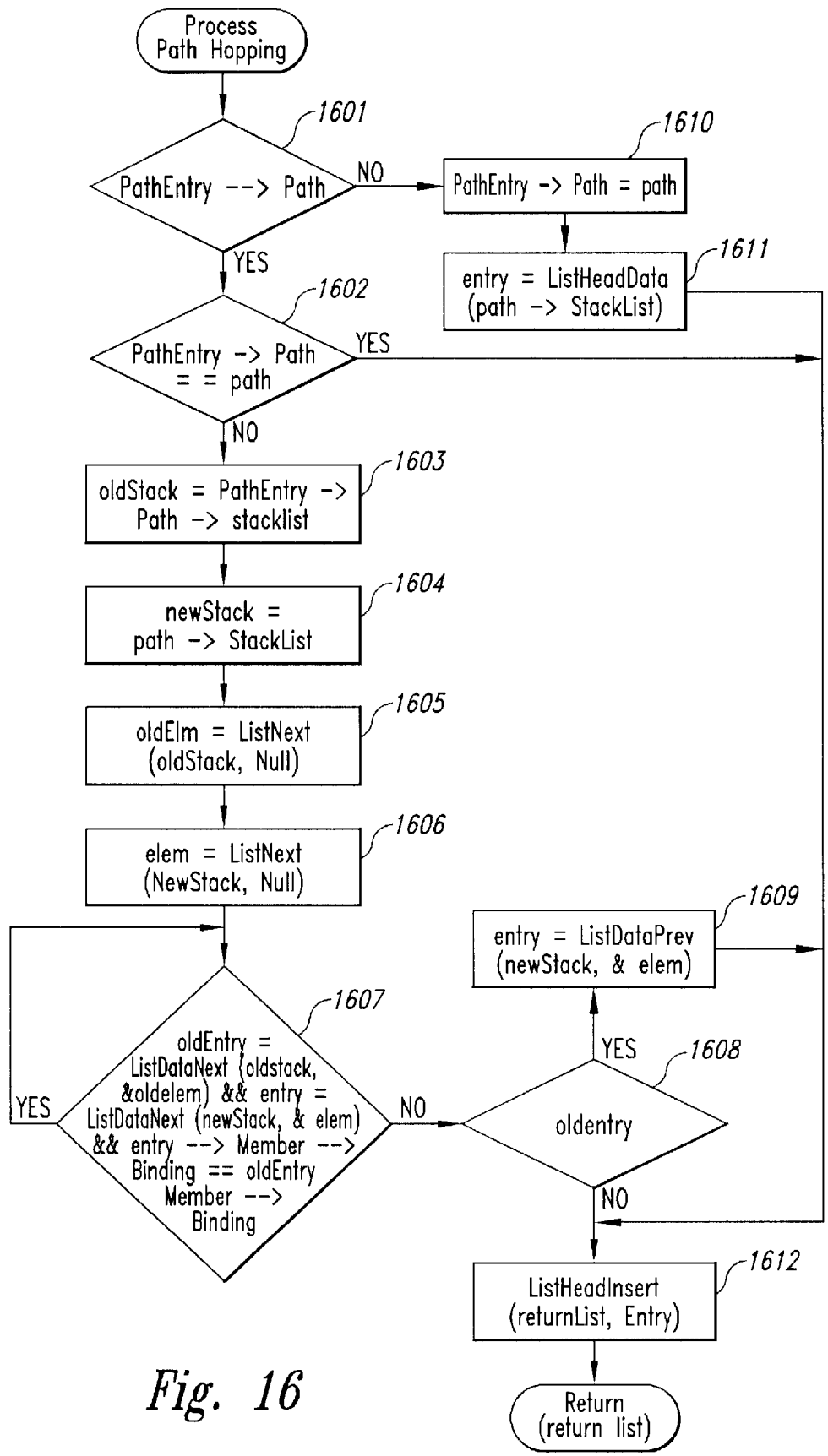
FIG. 16 is a flow diagram of the process of path hopping routine.

FIG. 16 is a flow diagram of the process of path hopping routine. Path hopping occurs when the path through the binding list is not the same path as that of the passed path entry. In decision block 1601, if the path of the passed path entry is set, then the routine continues at block 1602, else the routine continues at block 1609. In decision block 1602, if the path of the passed path entry is equal to the local path, then the routine continues at 1612, else path hopping is occurring and the routine continues at block 1603. In blocks 1603–1607, the routine loops positioning pointers at the first path entries of the paths that are not at the same binding. In block 1603, the routine sets the variable old stack to the stack list of the path of the passed path entry. In block 1604, the routine sets the variable new stack to the stack list of the local path. In block 1605, the routine sets the variable old element to the next element in the old stack. In block 1606, the routine sets the variable element to the next element in the new stack. In decision block 1607, the routine loops until the path entry that is not in the same binding is located. In decision block 1608, if the variable old entry is set, then the routine is not at the end of the hopped-from path and the routine continues at block 1609, else routine continues at block 1612. In block 1609, the routine sets the variable entry to the previous entry in the hopped-to path. In block 1610, the routine sets the path of the passed path entry to the local path. In block 1611, the routine sets the local entry to the first path entry of the stack list of the local path. In block 1612, the routine inserts an entry into return list and then returns.

Although the conversion system has been described in terms of various embodiments, the invention is not limited to these embodiments. Modification within the spirit of the invention will be apparent to those skilled in the art. For example, a conversion routine may be used for routing a message and may perform no conversion of the message. Also, a reference to a single copy of the message can be passed to each conversion routine or demuxkey routine. These routines can advance the reference past the header information for the protocol so that the reference is positioned at the next header. After the demux process, the reference can be reset to point to the first header for processing by the conversion routines in sequence. The scope of the invention is defined by the claims that follow.

What is claimed is:

1. A method in a computer system for processing a message having a sequence of packets, the method comprising:

providing a plurality of components, each component being a software routine for converting data with an input format into data with an output format;

for the first packet of the message, identifying a sequence of components for processing the packets of the message such that the output format of the components of the sequence match the input format of the next component in the sequence; and storing an indication of each of the identified components so that the sequence does not need to be re-identified for subsequent packets of the message; and for each of a plurality of packets of the message in sequence, for each of a plurality of components in the identified sequence, retrieving state information relating to performing the processing of the component with the previous packet of the message;

performing the processing of the identified component with the packet and the retrieved state information; and storing state information relating to the processing of the component with the packet for use when processing the next packet of the message.

2. The method of claim 1 wherein the storing of an indication of each of the identified components includes storing a key for use in retrieving state information relating to the message.

3. The method of claim 1 wherein a second component of the sequence of components that are identified is identified after the processing of the first packet by a first component is performed.

4. The method of claim 1 wherein the packet may be transformed by each component of an identified sequence.

5. The method of claim 1 wherein the identified sequence of components for two messages are different.

6. The method of claim 1 including creating a separate thread for each message.

7. The method of claim 6 wherein the identified sequence of components for a message are executed by the thread for the message.

8. The method of claim 1 wherein the retrieving of state information includes requesting the component to provide the state information.

9. The method of claim 1 wherein the performing of the processing of the component includes deferring performing of the next component in the identified sequence until multiple packets are processed by the component.

10. The method of claim 1 wherein the identifying of a sequence of components includes deferring identification of the next component of the sequence until processing of the last component identified so far in the sequence is performed.

11. The method of claim 1 wherein two messages share one or more components and associated state information.

12. The method of claim 1 wherein an output format of a component in the identified sequence for a message matches an input format of the next component in the identified sequence for the message.

13. The method of claim 1 wherein a component has multiple output formats.

14. The method of claim 1 wherein a plurality of sequences of components are identified for a message.

15. A method in a computer system demultiplexing packets of messages, the method comprising:

identifying a sequence of components for processing each message based on the first packet of the message so that subsequent packets of the message can be processed without re-identifying the components, wherein different sequences of components can be identified for different messages, each component being a software routine; and for each packet of each message, performing the processing of the identified sequence of components of the message wherein state information generated by performing the processing of a component for a packet is available to the component when the component processes the next packet of the message.

16. The method of claim 15 wherein the sequence of components is identified as the first packet of the message is processed.

17. The method of claim 15 wherein a packet of a message as processed by a component of the identified sequence for the message is available to the next component in the identified sequence.

18. The method of claim 15 wherein the components of an identified sequence for a message are executed within a thread associate with a single message.

19. The method of claim 15 wherein the state information includes requesting the component that generated the state information to provide the state information.

20. The method of claim 15 wherein the performing of the processing of the component includes deferring performing of the next component in the identified sequence until multiple packets are processed by the component.

21. The method of claim 15 wherein the identifying of a sequence of components includes deferring identification of the next component of the sequence until processing of the last component identified so far in the sequence is complete.

22. The method of claim 15 wherein two messages share one or more components and associated state information.

23. The method of claim 15 wherein an output format of a component in the identified sequence for a message matches an input format of the next component in the identified sequence for the message.

24. The method of claim 15 wherein a component has multiple output formats.

25. The method of claim 15 wherein a plurality of sequences of components are identified for a message.

26. A computer system for processing packets of messages, the method comprising:

a plurality of components, each component having an input format and an output format;

identification means that identifies a sequence of components for each message after a packet of the message has been received, such that the output format of a component in an identified sequence matches the input format of the next component in the identified sequence;

receiving means that receives packets of the messages; and demultiplexing means that routes packets of messages to the sequence of components identified for each message for performing the processing of the components on the packets.

27. The computer system of claim 26 including means that stores and retrieves state information for each component of the identified sequence of components for each message.

28. The computer system of claim 26 wherein a packet of a message as processed by a component of the identified sequence for the message is available to the next component in the identified sequence.

29. The computer system of claim 26 wherein the performing of the processing of the component includes deferring performing of the next component in the identified sequence until multiple packets are processed by the component.

30. The computer system of claim 26 wherein identification means deferring identification of the next component of the sequence until processing of the last component identified so far in the sequence is complete.

31. The computer system of claim 26 wherein two messages share one or more components and associated state information.

32. The computer system of claim 26 wherein an output format of a component in the identified sequence for a message matches an input format of the next component in the identified sequence for the message.

33. The computer system of claim 26 wherein a component has multiple output formats.

34. The computer system of claim 26 wherein the identification means identifies a plurality of sequences of components for a message.

35. A computer-readable medium containing instruction demultiplexing packets of messages, by method comprising:

identifying a message-specific sequence of components for processing the packets of each message upon receiving the first packet of the message wherein subsequent packets of the message can use the message-specific sequence identified when the first packet was received; and for each packet of the message, invoking the identified sequence of components in sequence to perform the processing of each component for the packet wherein each component saves message-specific state information so that that component can use the save message-specific state information when that component performs its processing on the next packet of the message.

36. The computer-readable medium of claim 35 wherein a second component of the message-specific sequence is identified after the first packet is processed by a first component of the message-specific sequence.

37. The computer-readable medium of claim 35 wherein a packet may be transformed by each component of an identified sequence.

38. The computer-readable medium of claim 35 including creating a separate thread for each message.

39. The computer-readable medium of claim 38 wherein the identified sequence of components for a message is executed by the thread for the message.

40. The computer-readable medium of claim 35 wherein the performing of the processing of the component includes deferring performing of the next component in the identified sequence until multiple packets are processed by the component.

41. The computer-readable medium of claim 35 wherein the identifying of a sequence of components includes deferring identification of the next component of the sequence until processing of the last component identified so far in the sequence is performed.

42. The computer-readable medium of claim 35 wherein two messages share one or more components and associated state information.

43. The computer-readable medium of claim 35 wherein an output format of a component in the identified sequence for a message matches an input format of the next component in the identified sequence for the message.

44. The computer-readable medium of claim 35 wherein a plurality of sequences of components are identified for a message.

* * * * *

UNITED STATES PATENT AND TRADEMARK OFFICE
CERTIFICATE OF CORRECTION

PATENT NO.     : 6,629,163 B1                                       Page 1 of 1
DATED          : September 30, 2003
INVENTOR(S)    : Balassanian It is certified that error appears in the above-identified patent and that said Letters Patent is hereby corrected as shown below:

Column 9,
Line 60, delete comma between "was" and "postponed";

Column 12,
Line 63, "1469" should be -- 1409 --;

Signed and Sealed this

Second Day of December, 2003

JAMES E. ROGAN
*Director of the United States Patent and Trademark Office*

(12) EX PARTE REEXAMINATION CERTIFICATE (7567th)
United States Patent
Balassanlan

(10) Number: US 6,629,163 C1
(45) Certificate Issued: Jun. 22, 2010

(54) METHOD AND SYSTEM FOR DEMULTIPLEXING A FIRST SEQUENCE OF PACKET COMPONENTS TO IDENTIFY SPECIFIC COMPONENTS WHEREIN SUBSEQUENT COMPONENTS ARE PROCESSED WITHOUT RE-IDENTIFYING COMPONENTS

(75) Inventor: Edward Balassanlan, Kirkland, WA (US)

(73) Assignee: Implicit Networks, Inc., Bellevue, WA (US)

Reexamination Request:
No. 90/010,356, Dec. 18, 2008

Reexamination Certificate for:
Patent No.: 6,629,163
Issued: Sep. 30, 2003
Appl. No.: 09/474,664
Filed: Dec. 29, 1999

Certificate of Correction issued Dec. 2, 2003.

(51) Int. Cl.
*G06F 13/00* (2006.01)
*H04L 12/54* (2006.01)
*H04L 12/56* (2006.01)

(52) U.S. Cl. ............ 710/33; 710/1; 710/3; 710/20; 710/38; 710/51; 370/401; 370/487; 370/498; 370/535; 370/536; 370/542

(58) Field of Classification Search .......... None
See application file for complete search history.

(56) References Cited

U.S. PATENT DOCUMENTS

| | | | |
|---|---|---|---|
| 5,392,390 A | 2/1995 | Crozier | |
| 5,627,997 A | 5/1997 | Pearson et al. | |
| 5,768,521 A | 6/1998 | Dedrick | |
| 5,848,415 A | 12/1998 | Guck | |
| 6,047,002 A | 4/2000 | Hartmann et al. | |
| 6,101,320 A | 8/2000 | Schuetze et al. | |
| 6,104,704 A | 8/2000 | Buhler et al. | |
| 6,128,624 A | 10/2000 | Papierniak et al. | |
| 6,192,419 B1 | 2/2001 | Aditham et al. | |
| 6,199,054 B1 | 3/2001 | Khan et al. | |
| 6,212,550 B1 | 4/2001 | Segur | |
| 6,222,536 B1 | 4/2001 | Kihl et al. | |
| 6,246,678 B1 | 6/2001 | Erb | |
| 6,356,529 B1 | 3/2002 | Zarom | |
| 6,405,254 B1 | 6/2002 | Hadland | |
| 6,574,610 B1 | 6/2003 | Clayton et al. | |
| 6,651,099 B1 | 11/2003 | Dietz et al. | |
| 6,785,730 B1 | 8/2004 | Taylor | |
| 7,233,948 B1 | 6/2007 | Shamoon et al. | |

OTHER PUBLICATIONS

Internetworking with TCP/IP, vol. 1: Principles, Protocols, and Architecture, Second Edition, Douglas E. Comer, Prentice Hall, 1991, Chapter 10 and glossary; vol. II: Design, Implementation, and Internals, Douglas E. Comer and David L. Stevens, Prentice Hall, 1991, Chapters 1–3, 5, 10, 11, and 16 (Appendix "B" to Reexam).

TCP/IP Illustrated vol. 1, W., Addison–Wesley, 1994, Richard Stevens, chapters 1, 8, and 18; TCP/IP Illustrated vol. 2, Gary Wright and W. Richard Stevens, chapters 22, 24, 28, and 29, 1995 (Appendix "C" to Reexam).

Scout: A Path–Based Operating System, David Mosberger, 1997 (Doctoral Dissertation Submitted to the University of Arizona) (Appendix "D" to Reexam).

*Primary Examiner*—Matthew Heneghan

(57) ABSTRACT

A method and system for demultiplexing packets of a message is provided. The demultiplexing system receives packets of a message, identifies a sequence of message handlers for processing the message, identifies state information associated with the message for each message handler, and invokes the message handlers passing the message and the associated state information. The system identifies the message handlers based on the initial data type of the message and a target data type. The identified message handlers effect the conversion of the data to the target data type through various intermediate data types.

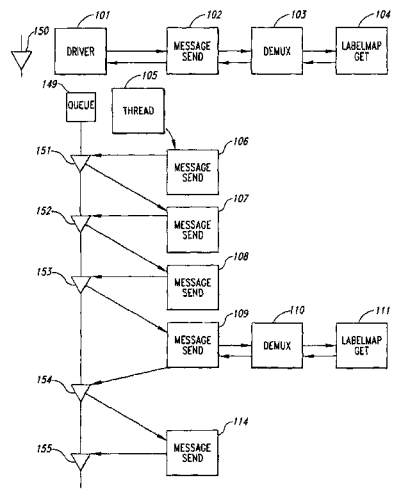

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-5, 7, 9, 10, 12, 14-18, 20, 21, 23, 25, 26, 35-37, 39-41, 43 and 44 is determined to be patentable as amended.

Claims 6, 8, 11, 13, 19, 22, 24, 27-34, 38 and 42, dependent on an amended claim, are determined to be patentable.

New claim 45 is added and determined to be patentable.

1. A method in a computer system for processing a message having a sequence of packets, the method comprising:
   providing a plurality of components, each component being a software routine for converting data with an input format into data with an output format;
   for the first packet of the message,
      *dynamically* identifying a *non-predefined* sequence of components for processing the packets of the message such that the output format of the components of the *non-predefined* sequence match the input format of the next component in the *non-predefined* sequence, *wherein dynamically indentifying includes selecting individual components to create the non-predefined sequence of components after the first packet is received*; and
      storing an indication of each of the identified components so that the *non-predefined* sequence does not need to be re-identified for subsequent packets of the message; and
   for each of a plurality of packets of the message in sequence,
      for each of a plurality of components in the identified *non-predefined* sequence,
         retrieving state information relating to performing the processing of the component with the previous packet of the message;
         performing the processing of the identified component with the packet and the retrieved state information; and
         storing state information relating to the processing of the component with packet for use when processing the next packet of the message.

2. The method of claim 1 wherein the storing of an indication of each of the *dynamically* identified components includes storing a key for use in retrieving state information relating to the message.

3. The method of claim 1 wherein a second component of the *non-predefined* sequence of components that are *dynamically* identified is identified after the processing of the first packet by a first component is performed.

4. The method of claim 1 wherein the packet may be tranformed by each component of an identified *non-predefined* sequence.

5. The method of claim 1 wherein the identified *non-predefined* sequence of components for two messages are different.

7. The method of claim 6 wherein the identified *non-predefined* sequence of components for a message are executed by the thread for the message.

9. The method of claim 1 wherein the performing of the processing of the component includes deferring performing of the next component in the identified *non-predefined* sequence until multiple packets are processed by the component.

10. The method of claim 1 wherein the *dynamically* identifying of a *non-predefined* sequence of components includes deferring identification of the next component of the *non-predefined* sequence until processing of the last component identified so far in the *non-predefined* sequence is performed.

12. The method of claim 1 wherein an output format of a component in the identified *non-predefined* sequence for a message matches an input format of the next component in the identified *non-identified* sequence for the message.

14. The method of claim 1 wherein a plurality of *non-predefined* sequences of components are *dynamically* identified for a message.

15. A method in a computer system *for* demultiplexing packets of messages, the method comprising:
   *dynamically* identifying a *non-predefined* sequence of components for processing each message based on the first packet of the message so that subsequent packets of the message can be processed without re-identifying the components, wherein different *non-predefined* sequences of components can be identified for different messages, each component being a software routine, *and wherein dynamically identifying includes selecting individual components to create the non-predefined sequence of components*; and
   for each packet of each message, performing the processing of the identified *non-predefined* sequence of components of the message wherein state information generated by performing the processing of a component for a packet is available to the component when the component processes the next packet of the message.

16. The method of claim 15 wherein the identified *non-predefined* sequence of components is identified as the first packet of the message is processed.

17. The method of claim 15 wherein a packet of a message processed by a component of the identified *non-predefined* sequence for the message is available to the next component in the identified *non-predefined* sequence.

18. The method of claim 15 wherein the components of an identified *non-predefined* sequence for a message are executed within a thread [associate] *associated* with a single message.

20. The method of claim 15 wherein the performing of the processing of the component includes deferring performing of the next component in the identified *non-predefined* sequence until multiple packets are processed by the component.

21. The method of claim 15 wherein the *dynamically* identifying of a *non-predefined* sequence of components includes deferring identification of the next component of the *non-predefined* sequence until processing of the last component identified so far in the *non-predefined* sequence is complete.

23. The method of claim 15 wherein an output format of a component in the identified *non-predefined* sequence for a message matches an input format of the next component in the identified *non-predefined* sequence for the message.

25. The method of claim 15 wherein the identified *non-predefined* sequences of components are identified for a message.

26. A computer system for processing packets of messages, the [method] *system* comprising:
- a plurality of components, each component having an input format and an output format;
- identification means that identifies a sequence of components for each message after a packet of message has been received, such that the output format of a component in an identified sequence matches the input format of the next component in the identified sequence;
- receiving means that receives packets of the messages; and
- demultiplexing means that routes packets of messages to the sequence of components identified for each message for performing the processing of the components on the packets.

35. A computer-readable medium containing [instruction] *instructions for* demultiplexing packets of messages, by method comprising:
- *dynamically* identifying a message-specific *non-predefined* sequence of components for processing the packets of each message upon receiving the first packet of the message wherein subsequent packets of the message can use the message-specific *non-predefined* sequence identified when the first packet was received, *and wherein dynamically identifying includes selecting individual components to create the message-specific non-predefined sequence of components*; and
- for each packet of each message, invoking the identified *non-predefined* sequence of componentsin sequence to perform the processing of each component for the packet wherein each component saves message-specific state information so that that component can use the [save] *saved* message-specific state information when that component performs its processing on the next packet of the message.

36. The computer-readable medium of claim 35 wherein a second component of the message-specific *non-predefined* sequence is identified after the first packet is processed by a first component of the message-specific *non-predefined* sequence.

37. The computer-readable medium of claim 35 wherein a packet may be transformed by each component of an identified *non-predefined* sequence.

39. The computer-readable medium of claim 38 wherein the identified *non-predefined* sequence of components for a message is executed by the thread for the message.

40. The computer-readable medium of claim 35 wherein the performing of the processing of the component includes deferring performing of the next component in the identified *non-predefined* sequence untl multiple packets are procesed by the component.

41. The computer-readable medium of claim 35 wherein the *dynamically* identifying of a *non-predefined* sequence of components includes deferring identification of the next component of the *non-predefined* sequence until processing of the last component identified so far in the *non-predefined* sequence is performed.

43. The computer-readable medium of claim 35 wherein an output format of a component in the identified *non-predefined* sequence for a message matches an input format of the next component in the identified *non-predefined* sequence for the message.

44. The computer-readable medium of claim 35 wherein a plurality of *non-predefined* sequences of components are identified for a message.

*45. A computer-readable medium containing instructions for demultiplexing packets of a message, by a method comprising:*
- *identifying a message-specific sequence of components for processing the packets of each message upon receiving the first packet of the message wherein each component in the sequence is identified by using the output format of the previous component to identify a component with a compatible input format, and wherein subsequent packets of the message can use the message-specific sequence identified when the first packet was received;*
- *for each packet of the message, invoking the identified sequence of components in sequence to perform the processing of each component for the packet, wherein each component saves message-specific state information so that that component can use the saved message-specific state information when that component performs its processing on the next packet of the message.*

* * * * *